US006983213B2

(12) United States Patent  (10) Patent No.: US 6,983,213 B2
Wang  (45) Date of Patent: Jan. 3, 2006

(54) METHODS FOR OPERATING MASS SPECTROMETRY (MS) INSTRUMENT SYSTEMS

(75) Inventor: Yongdong Wang, Wilton, CT (US)

(73) Assignee: Cerno Bioscience LLC, Wilton, CT (US)

( * ) Notice: Subject to any disclaimer, the term of this patent is extended or adjusted under 35 U.S.C. 154(b) by 0 days.

(21) Appl. No.: 10/689,313

(22) Filed: Oct. 20, 2003

(65) Prior Publication Data

US 2005/0086017 A1  Apr. 21, 2005

(51) Int. Cl.
*G01R 35/00*  (2006.01)
*H01J 49/00*  (2006.01)
(52) U.S. Cl. .................. 702/85; 250/282; 250/287; 436/58; 702/23; 702/27; 702/104; 702/109; 702/189
(58) Field of Classification Search .................. 702/19, 702/23, 27, 28, 185, 89, 104, 189, 109; 250/281, 250/282, 287, 288; 435/6, 7.1; 436/87, 436/518, 536, 58
See application file for complete search history.

(56) References Cited

U.S. PATENT DOCUMENTS

| 5,206,174 | A | 4/1993 | Gehrke et al. ................ 436/58 |
| 6,049,762 | A | 4/2000 | Ganz et al. |
| 6,138,082 | A | 10/2000 | Wang et al. ................ 702/189 |
| 6,373,052 | B1 * | 4/2002 | Hoyes et al. ................ 250/287 |
| 6,519,543 | B1 * | 2/2003 | Giannuzzi et al. .......... 702/104 |
| 6,629,040 | B1 | 9/2003 | Goodlett et al. ............. 702/23 |
| 6,745,133 | B2 * | 6/2004 | Axelsson ..................... 702/27 |
| 2003/0218129 | A1 * | 11/2003 | Rather ........................ 250/282 |
| 2004/0024552 | A1 * | 2/2004 | Bowdler ..................... 702/89 |

OTHER PUBLICATIONS

D. L. Smith et al., Probing the Non-covalent Structure of Proteins by Amide Hydrogen Exchange and Mass Spectrometry, J. Mass Spectrometry, V32, p135-46, 1997.
J. Kast et al, Noise Filtering Techniques for Electrospray Quadrupole Time of Flight Mass Spectra, J. Am. Soc. Mass Spectrom., V14, p. 766-776, Jul., 2003.
J.A. Szymura et al., Band Composition Analysis: A New Procedure for Deconvolutionof the Mass Specrta of Organometallic Compounds, J. Mass Spectrom., V. 38, p 817-822, Jul., 2003.
W.R Cannon et al., Improved Peptide Sequencing Using Isotope Information Inherent in Tandem Mass Spectra, Rapid. Commun. Mass Spectrom., 17, 1793-1801,2003.
J.Fernandez-de-Cossio et al,Automated Interpretation of Mass Spectra of Complex Mixtures by Matching of Isotope. . . , Rapid.Commun.MassSpectrom., V18,p2465-247,2004.

(Continued)

*Primary Examiner*—Michael Nghiem
*Assistant Examiner*—John Le
(74) *Attorney, Agent, or Firm*—David Aker

(57) ABSTRACT

There is provided a method for obtaining at least one calibration filter for a Mass Spectrometry (MS) instrument system. Measured isotope peak cluster data in a mass spectral range is obtained for a given calibration standard. Relative isotope abundances and actual mass locations of isotopes corresponding thereto are calculated for the given calibration standard. Mass spectral target peak shape functions centered within respective mass spectral ranges are specified. Convolution operations are performed between the calculated relative isotope abundances and the mass spectral target peak shape functions to form calculated isotope peak cluster data. A deconvolution operation is performed between the measured isotope peak cluster data and the calculated isotope peak cluster data after the convolution operations to obtain the at least one calibration filter.

70 Claims, 16 Drawing Sheets

OTHER PUBLICATIONS

A.L., Rockwood, S.L., Van Orden, R.D. Smith, Rapid Calculation of Isotopc Distributions, Analytical Chemistry, Aug. 1, 1995, pp. 2699-2703, vol. 67, No. 15.

James A. Yergey, A General Approach to Calculating Isotopic Distributions for Mass Spectrometry, International Journal of Mass Spectrometry and Ion Physics, Mar. 1983, pp. 337-349, vol. 52, Elsevier Science Publishers, Amsterdam, Netherlands.

Y. Wang, D.J, Veltkamp, B.R. Kowalski, Multivariate Instrument Standardization, Analytical Chemistry, Dec. 1, 1991, pp. 2750-2756, vol. 63., No. 23.

B.R. Kowalski, M. B. Seasholtz, Recent Developments in Multivariate Calibration, Journal of Chemometrics, Jun. 1, 1990, pp. 129-145, vol. 5, John Wiley & Sons, Ltd.

J. Nieter, W. Wasserman, M. H. Kutner, Applied Linear Regression Models, 2d, 1989, Ch. 11, pp. 418-420, Irwin, Homewood, IL, Boston, MA.

J. Neter, W. Wasserman, M. H. Kutner, Applied Linear Regression Models, 2d, 1989, Ch. 8, pp. 295-305, Irwin, Homewood, IL, Boston, MA.

* cited by examiner

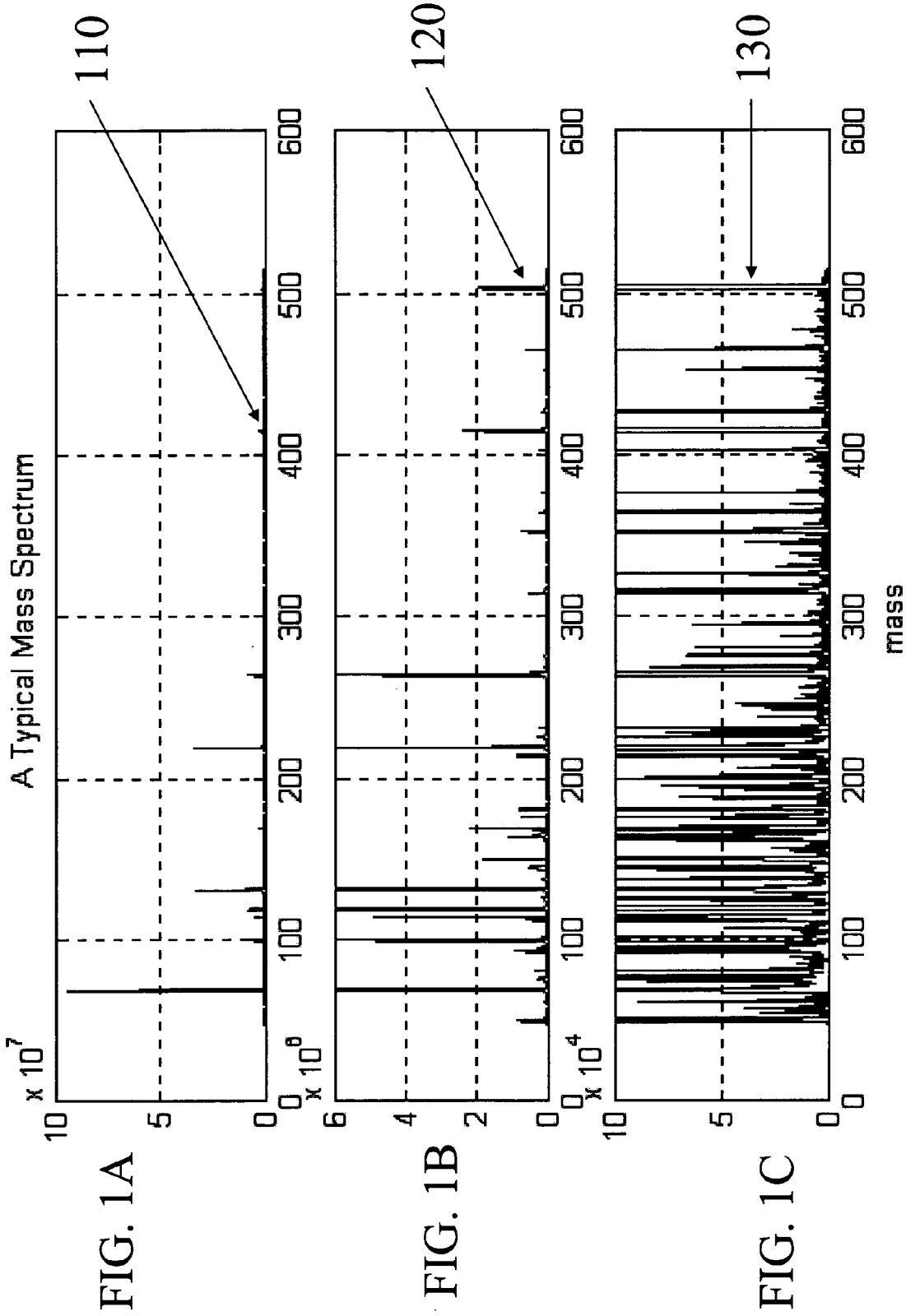

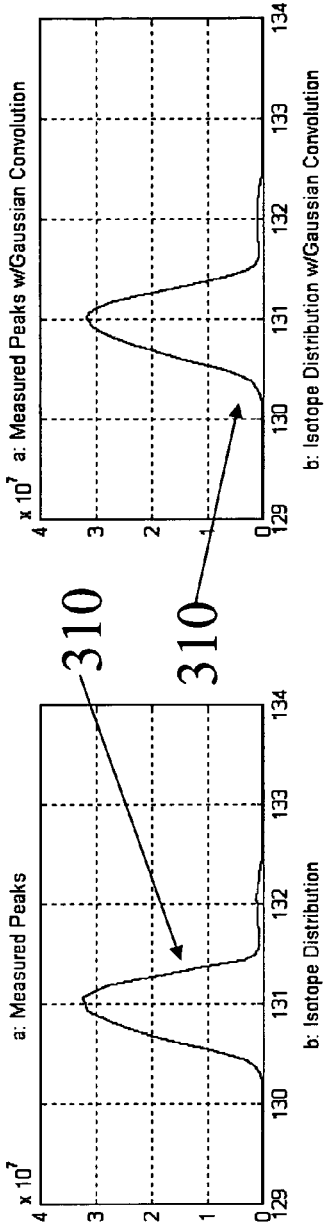
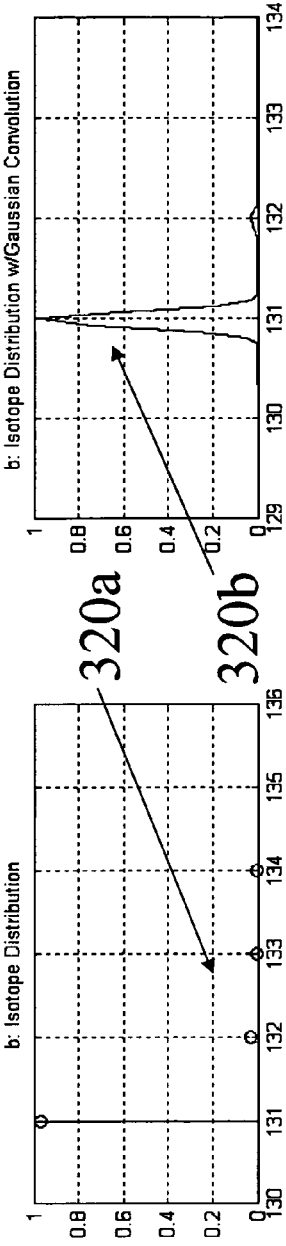
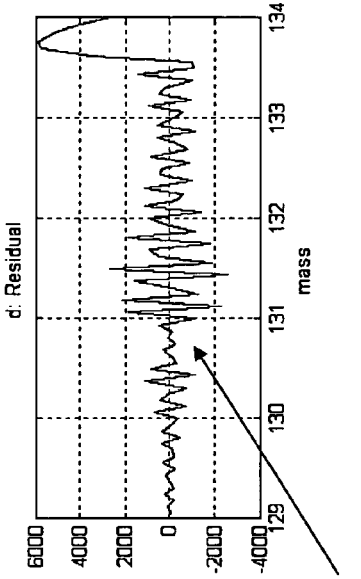
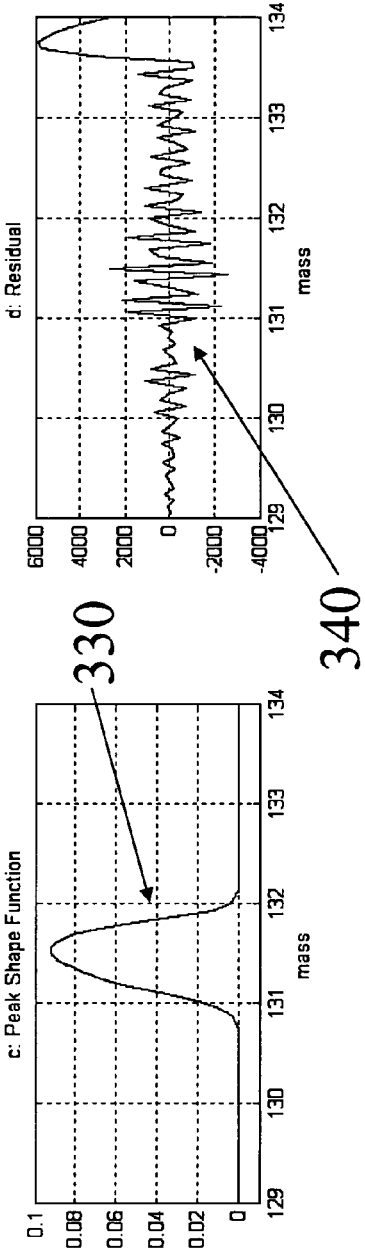
FIG. 3A  FIG. 3B  FIG. 3C  FIG. 3D  FIG. 3E  FIG. 3F

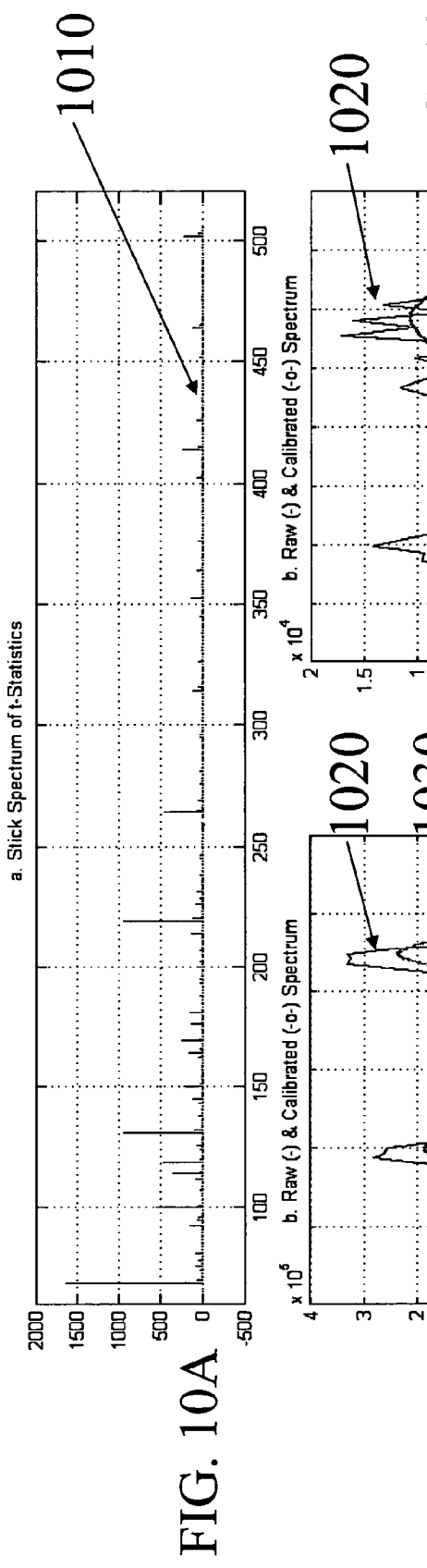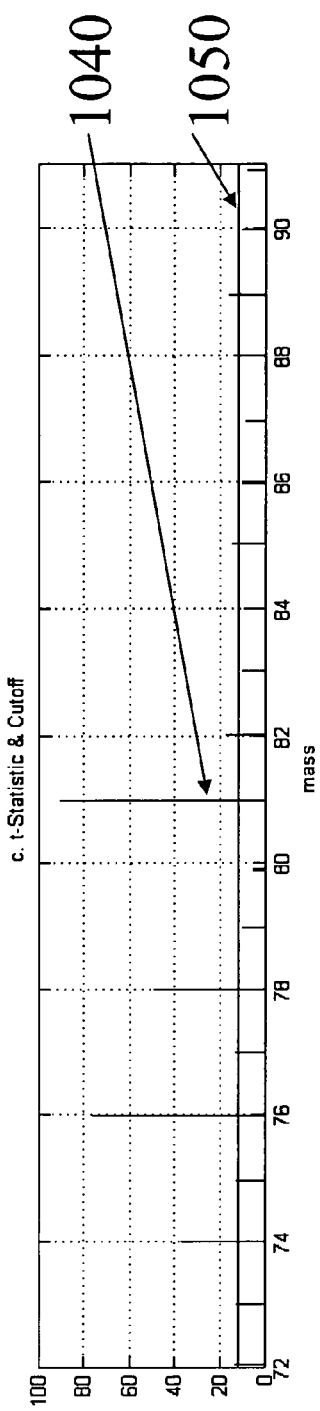
FIG. 10A
FIG. 10B
FIG. 10C
FIG. 10D

METHODS FOR OPERATING MASS SPECTROMETRY (MS) INSTRUMENT SYSTEMS

BACKGROUND OF THE INVENTION

1. Field of the Invention

The present invention generally relates to the field of Mass Spectrometry (MS) and, more particularly, to methods for calibrating MS instruments systems and for processing MS data.

2. Background of the Invention

Mass Spectrometry (MS) is a 100-year old technology that relies on the ionization and fragmentation of molecules, the dispersion of the fragment ions by their masses, and the proper detection of the ion fragments on the appropriate detectors. There are many ways to achieve each of these three key MS processes which give rise to different types of MS instrumentations having distinct characteristics.

Four major types of ionization techniques are commonly used to both break apart a larger molecule into many smaller molecules and at the same time ionize them so that they can be properly charged before mass dispersion. These ionization schemes include Electrospray Ionization (ESI), Electron Impact Ionization (EI) through the impact of high-energy electrons, Chemical Ionization (CI) through the use of other reactive compounds, and Matrix-Assisted Laser Desorption and Ionization (MALDI). Both ESI and MALDI also serve as means for sample introduction.

Once the molecules in a sample get fragmented and charged through ionization, each fragment will have a corresponding mass-to-charge (m/z) ratio, which will become the basis to mass dispersion. Based on the physical principles used, there are many different ways to achieve mass dispersion, resulting in mass spectral data similar in nature but different in details. A few of the commonly seen configurations include: magnetic sectors; quadrupoles; Time-Of-Flight (TOF); and Fourier Transform Ion-Cyclotron Resonance (FT ICR).

The magnetic sectors configuration is the most straight-forward mass dispersion technique where ions with different m/z ratios would separate in a magnetic field and exit this field at spatially separated locations where they will be detected with either a fixed array of detector elements or a movable set of small detectors that can be adjusted to detect different ions depending on the application. This is a simultaneous configuration where all ions from the sample are separated simultaneously in space rather than sequentially in time.

The quadrupoles configuration is perhaps the most popular MS configuration where ions of different m/z values will be filtered out of a set of (usually 4) parallel rods through the manipulation of RF/DC ratios applied to these rod pairs. Only ions of a certain m/z value will survive the trip through these rods at a given RF/DC ratio, resulting in the sequential separation and detection of fragment ions. Due to its sequential nature, only one detector element is required for detection. Another configuration that uses ion traps can be considered a special example of quadrupole MS.

The Time-Of-Flight (TOF) configuration is another sequential dispersion and detection scheme that lets the fragment ions accelerate under electrical field through a high vacuum flight tube before detection. Ions of different m/z values would arrive at different times to the detector and the arrival time can be related to the m/z values through the use of calibration standard(s).

In Fourier Transform Ion-Cyclotron Resonance (FT ICR), after fragmentation and ionization, all ions can be introduced to an ion cyclotron where ions of different m/z ratios would be trapped and resonate at different frequencies. These ions can be pulsed out through the application of a Radio Frequency (RF) signal and the ion intensities measured as a function of time on a detector. Upon Fourier transformation of the time domain data measured, one gets back the frequency domain data where the frequency can be related back to m/z ratios through the use of calibration standard(s).

Ions can be detected either directly by the use of Faraday cups or indirectly by the use of electron multiplier tubes (EMT)/plates (EMP) or photon multiplier tubes (PMT) after a converter that converts ions into light. FIGS. 1A, 1B, and 1C are diagrams illustrating a typical mass spectral data trace on different ion intensity scales 110, 120, and 130 respectively plotted as a function of m/z ratio, according to the prior art.

The past one hundred years have witnessed tremendous strides made on the MS instrumentation with many different flavors of instruments designed and built for high throughput, high resolution, and high sensitivity work. The instrumentation has been developed to a stage where single ion detection can be routinely accomplished on most commercial MS systems with unit mass resolution allowing for the observation of ion fragments coming from different isotopes. In stark contrast to the sophistication in hardware, very little has been done to systematically and effectively analyze the massive amount of MS data generated by modern MS instrumentation.

On a typical mass spectrometer, the user is usually required or supplied with a standard material having several fragment ions covering the mass spectral m/z range of interest. Subject to baseline effects, isotope interferences, mass resolution, and resolution dependence on mass, peak positions of a few ion fragments are determined either in terms of centroids or peak maxima through a low order polynomial fit at the peak top. These peak positions are then fit to the known peak positions for these ions through either $1^{st}$ or other higher order polynomials to calibrate the mass (m/z) axis.

After the mass axis calibration, a typical mass spectral data trace would then be subjected to peak analysis where peaks (ions) are identified. This peak detection routine is a highly empirical and compounded process where peak shoulders, noise in data trace, baselines due to chemical backgrounds or contamination, isotope peak interferences, etc., are considered.

For the peaks identified, a process called centroiding is typically applied where an attempt at calculating the integrated peak areas and peak positions would be made. Due to the many interfering factors outlined above and the intrinsic difficulties in determining peak areas in the presence of other peaks and/or baselines, this is a process plagued by many adjustable parameters that can make an isotope peak appear or disappear with no objective measures of the centroiding quality.

A description will now be given of some of the many disadvantages of the conventional approaches to processing mass spectrometry data.

One disadvantage is the lack of mass accuracy. The mass calibration currently in use usually does not provide better than 0.1 amu (m/z unit) in mass determination accuracy on a conventional MS system with unit mass resolution (ability to visualize the presence or absence of a significant isotope peak). In order to achieve higher mass accuracy and reduce ambiguity in molecular fingerprinting such as peptide mapping for protein identification, one has to switch to an MS system with higher resolution such as quadrupole TOF (qTOF) or FT ICR MS which comes at a significantly higher cost.

Another disadvantage is the large peak integration error. Due to the contribution of mass spectral peak shape, its variability, the isotope peaks, the baseline and other background signals, and the random noise, current peak area integration has large errors (both systematic and random errors) for either strong or weak mass spectral peaks.

Yet another disadvantage includes difficulties with isotope peaks. Current approaches do not have a good way to separate the contributions from various isotopes which usually give out partially overlapped mass spectral peaks on conventional MS systems with unit mass resolution. The empirical approaches used either ignore the contributions from neighboring isotope peaks or over-estimate them, resulting in errors for dominating isotope peaks and large biases for weak isotope peaks or even complete ignorance of the weaker peaks. When ions of multiple charges are concerned, the situation becomes even worse, due to the now reduced separation in m/z mass unit between neighboring isotope peaks.

Yet still another disadvantage is nonlinear operation. The current approaches use a multi-stage disjointed process with many empirically adjustable parameters during each stage. Systematic errors (biases) are generated at each stage and propagated down to the later stages in an uncontrolled, unpredictable, and nonlinear manner, making it impossible for the algorithms to report meaningful statistics as measures of data processing quality and reliability.

A further disadvantage is the dominating systematic errors. In most of MS applications, ranging from industrial process control and environmental monitoring to protein identification or biomarker discovery, instrument sensitivity or detection limit has always been a focus and great efforts have been made in many instrument systems to minimize measurement error or noise contribution in the signal. Unfortunately, the peak processing approaches currently in use create a source of systematic error even larger than the random noise in the raw data, thus becoming the limiting factor in instrument sensitivity.

An additional disadvantage is mathematical and statistical inconsistency. The many empirical approaches currently used make the whole mass spectral peak processing inconsistent either mathematically or statistically. The peak processing results can change dramatically on slightly different data without any random noise or on the same synthetic data with slightly different noise. In order words, the results of the peak processing are not robust and can be unstable depending on the particular experiment or data collection.

Moreover, another disadvantage is the instrument-to-instrument variations. It has usually been difficult to directly compare raw mass spectral data from different MS instruments due to variations in the mechanical, electromagnetic, or environmental tolerances. With the current ad hoc peak processing applied on the raw data, it only adds to the difficulty of quantitatively comparing results from different MS instruments. On the other hand, the need for comparing either raw mass spectral data directly or peak processing results from different instruments or different types of instruments has been increasingly heightened for the purpose of impurity detection or protein identification through computer searches in established MS libraries.

Accordingly, it would be desirable and highly advantageous to have methods for calibrating Mass Spectrometry (MS) instruments systems and for processing MS data that overcome the above-described deficiencies and disadvantages of the prior art.

SUMMARY OF THE INVENTION

The problems stated above, as well as other related problems of the prior art, are solved by the present invention, methods for calibrating Mass Spectrometry (MS) instruments systems and for processing MS data.

According to an aspect of the present invention, there is provided a method for obtaining at least one calibration filter for a Mass Spectrometry (MS) instrument system. Measured isotope peak cluster data in a mass spectral range is obtained for a given calibration standard. Relative isotope abundances and actual mass locations of isotopes corresponding thereto are calculated for the given calibration standard. Mass spectral target peak shape functions centered within respective mass spectral ranges are specified. Convolution operations are performed between the calculated relative isotope abundances and the mass spectral target peak shape functions to form calculated isotope peak cluster data. A deconvolution operation is performed between the measured isotope peak cluster data and the calculated isotope peak cluster data after the convolution operations to obtain the at least one calibration filter.

According to another aspect of the present invention, there is provided a method of processing raw mass spectral data. A total filtering matrix is applied to the raw mass spectral data to obtain calibrated mass spectral data. The total filtering matrix is formed by measured isotope peak cluster data, obtained for a given calibration standard in a mass spectral range. The total filtering matrix is further formed by relative isotope abundances and actual mass locations of isotopes corresponding thereto, calculated for a same calibration standard. The total filtering matrix is further formed by specified mass spectral target peak shape functions centered within the mass spectral range. The total filtering matrix is further formed by convolution operations performed between the calculated relative isotope abundances and the mass spectral target peak shape functions to form calculated isotope peak cluster data. The total filtering matrix is further formed by a deconvolution operation performed between the measured isotope peak cluster data and calculated isotope peak cluster data after the convolution operations to obtain at least one calibration filter for the total filtering matrix.

According to yet another aspect of the present invention, there is provided a method for analyzing mass spectral peaks corresponding to mass spectral data obtained from a Mass Spectrometry (MS) instrument system. A weighted regression operation is applied to mass spectral peaks within a mass spectral range. Regression coefficients are reported as one of integrated peak areas and mass deviations corresponding to one of nominal masses and estimated actual masses.

According to still yet another aspect of the present invention, there is provided a method for calculating calibration filters for a Mass Spectrometry (MS) instrument system. At least one mass spectral peak shape function is obtained from a given calibration standard. Mass spectral target peak shape functions centered at mid points within respective mass spectral ranges are specified. A deconvolution operation is performed between the obtained at least one mass spectral peak shape function and the mass spectral target peak shape functions. At least one calibration filter is calculated from a result of the deconvolution operation.

According to a further aspect of the present invention, there is provided a method of processing raw mass spectral data. A total filtering matrix is applied to the raw mass spectral data to obtain calibrated mass spectral data. The total filtering matrix is formed by obtaining, from a given calibration standard, at least one mass spectral peak shape function. The total filtering matrix is further formed by specifying mass spectral target peak shape functions centered at mid points within respective mass spectral ranges. The total filtering matrix is further formed by performing a deconvolution operation between the obtained at least one mass spectral peak shape function and the mass spectral target peak shape functions. The total filtering matrix is further formed by calculating at least one calibration filter from a result of the deconvolution operation.

These and other aspects, features and advantages of the present invention will become apparent from the following detailed description of preferred embodiments, which is to be read in connection with the accompanying drawings.

BRIEF DESCRIPTION OF THE DRAWINGS

FIGS. 1A, 1B, and 1C are diagrams illustrating a typical mass spectral data trace on different ion intensity scales 110, 120, and 130 respectively plotted as a function of m/z ratio, according to the prior art;

FIGS. 3A and 3B are diagrams respectively illustrating the measured isotope cluster 310 before and after pre-convolution, according to an illustrative embodiment of the present invention;

FIGS. 3C and 3D are diagrams respectively illustrating the calculated isotope cluster 320 before and after pre-convolution, according to an illustrative embodiment of the present invention;

FIGS. 3E and 3F are diagrams respectively illustrating the derived peak shape function 330 thus calculated and the corresponding deconvolution residual 340, according to an illustrative embodiment of the present invention;

FIG. 10A is a diagram illustrating a stick spectrum 1010 reflecting the t-statistic as a function of the exact mass locations (Equation 10) for possible mass spectral peaks across the mass range (raw mass spectrum taken from FIG. 1), according to an illustrative embodiment of the present invention;

FIGS. 10B and 10C are diagrams illustrating the overlay 1020 of the raw MS spectral segment and its fully calibrated version 1030, according to an illustrative embodiment of the present invention;

FIG. 10D is a diagram illustrating the corresponding t-statistic 1040 and a horizontal cutoff line 1050 with critical t values set at 12, according to an illustrative embodiment of the present invention;

DETAILED DESCRIPTION OF THE INVENTION

Figures 2A, 2B:
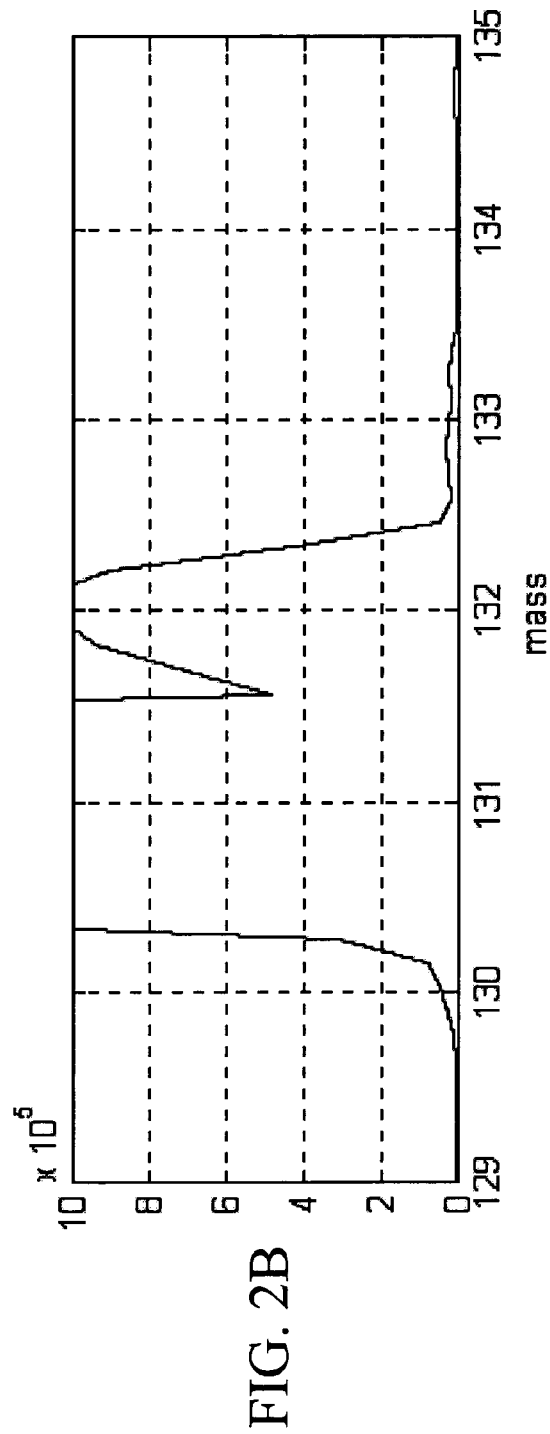
FIGS. 2A and 2B are diagrams illustrating mass spectral peak data for the ion fragment $C_3F_5$ on two different intensity scales.

The present invention is directed to methods for calibrating Mass Spectrometry (MS) instruments systems and for processing MS data.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

A novel approach to processing mass spectrometry data will now be described which will combine mass spectrometer calibration and mass spectral peak analysis into one total calibration process to address all the issues discussed above. Proper and accurate mass spectrometer calibration in both mass and peak shape will provide a solid foundation for accurate peak identification, analyte quantitation, and sample classification during the next stage of mass spectral data analysis.

A description will now be given of mass spectral calibration according to an illustrative embodiment of the present invention. The description of mass spectral calibration will include descriptions relating to the following: mass spectral calibration standard; calculation of relative isotope abundances; mass pre-alignment; mass spectral peak shape functions; peak shape function interpolation; calibration filters and their interpolation; application of calibration filters, and error propagation through calibration filters.

Instead of calibrating mass alone without consideration of mass spectral peak shape and its mass-dependency, a complete calibration including all of these will be carried out as part of the overall process. There are a few key steps in this complete calibration process, which will be discussed in detail below.

The description of a mass spectral calibration will now be given according to an illustrative embodiment of the present invention. A calibration standard that has mass fragments scattered over the whole mass range will be selected to provide both mass calibration and mass spectral peak shape information. Due to the presence of naturally occurring isotopes in the elements that form the standard molecule, typically multiple isotope peaks can be observed for the same ion fragment at different abundances.

A commonly used standard in gas chromatography-mass spectrometry (GC/MS) is perfluorotributylamine (formula: $C_{12}F_{27}N$, molecular weight: 671). It has EI fragments at 69, 100, 119, 131, 169, 219, 264, 364, 414, 464, 502, etc. (see FIG. 1 for an example spectrum). This standard is typically imbedded in a commercial GC/MS instrument so that the molecule can be readily vaporized and diffuse into the MS system at the time of calibration through a computer-controlled valve.

Other standards under a variety of ionization schemes include polymers and synthetic peptides that can fragment into multiple well-characterized ion fragments covering the mass range of interest. In tandem MS systems where a second fragmentation is carried out, for example, one can obtain a mass spectrum with regularly spaced mass spectral peaks from a parent peptide ion due to the loss of successive amino acids during this secondary fragmentation—a well-known process for peptide sequencing. Many intact proteins in ESI mode will carry multiple charges (z), sometimes from 1 to 10 or more, which will generate mass spectral peaks covering up to one order of magnitude or more in mass (m/z) range.

The description of the calculation of relative isotope abundances will now be given according to an illustrative embodiment of the present invention. On mass spectrometers that do not provide complete mass separation between different isotope peaks it is necessary to first calculate the relative isotope abundances and their exact mass locations. FIGS. 2A and 2B illustrate this limited mass separation between isotope peaks. A few published methods can be used to perform this theoretical calculation based on the elemental compositions, the known relative abundances of the elements contained in the ion fragment, and the electrical charges. Some of these methods are described by Alan Rockwood et al., in *Anal. Chem.*, 1995, 67, 2699, and by James Yergey, in *Int. J. Mass Spec. & Ion. Physics*, 1983, 52, 337, the disclosures of both of which are incorporated by reference herein.

For an ion fragment of the form $A_a B_b C_c D_d \ldots$, the isotope distribution is given by:

$$(\Sigma a_i A_i)^a (\Sigma b_i B_i)^b (\Sigma c_i C_i)^c (\Sigma d_i D_i)^d \ldots$$

where a, b, c, d, ... are the number of atoms A, B, C, D, ..., respectively, and $a_i, b_i, c_i, d_i, \ldots$ are the natural abundances for isotopes $A_i, B_i, C_i, D_i, \ldots$, respectively. This expression can be expanded and re-organized to give the mass locations and abundances of all expected isotopes. For example, for the ion fragment in FIGS. 2A and 2B, it is known that it has electrical charge of one and elemental composition of $C_3F_5$, with the natural abundance for C and F given by:

$C^{12}=12.000000$, $C_{12}=0.9893$
$C^{13}=13.003354$, $C_{13}=0.0107$
$F^{19}=18.998403$, $f_{19}=1.0000$.

The isotope masses (m) and relative abundances (y) for this ion fragment can therefore be calculated as $$m = \begin{bmatrix} 3C^{12} + 5F^{19} \\ 2C^{12} + C^{13} + 5F^{19} \\ C^{12} + 2C^{13} + 5F^{19} \\ 3C^{13} + 5F^{19} \end{bmatrix} = \begin{bmatrix} 130.992015 \\ 131.995369 \\ 132.998723 \\ 134.002077 \end{bmatrix}$$

$$y = \begin{bmatrix} c_{12}^3 \\ 3c_{13}c_{12}^2 \\ 3c_{13}^2 c_{12} \\ c_{13}^3 \end{bmatrix} = \begin{bmatrix} 9.6824 \times 10^{-1} \\ 3.1417 \times 10^{-2} \\ 3.3979 \times 10^{-4} \\ 1.2250 \times 10^{-6} \end{bmatrix}$$

Such isotope peak information (both mass locations and relative abundances) will be utilized later for the exact and complete calibration of mass spectral data.

The description of mass pre-alignment will now be given according to an illustrative embodiment of the present invention. In order to make more accurate peak shape interpolation in the next step, it is necessary to pre-align or pre-calibrate the standard mass spectrum first based on the identifiable isotope peak clusters across the spectrum. For each isotope peak cluster identified, a centroid is calculated as follows:

$$m_0 = \frac{y_0^T m_0}{y_0^T 1}$$

where $y_0$ is a column vector containing the actually measured mass spectral continuum data for the isotope cluster under consideration and the superscript T denotes transpose, i.e., a row vector containing all the same elements as the column version, $m_0$ is a column vector corresponding to the mass axis on which the isotope cluster is measured (can have either mass units or time units), and 1 is a column vector full of ones with the same length as $m_0$ or $y_0$. Similarly, another centroid can be calculated based on the calculated isotope distributions as follows:

$$m = \frac{y^T m}{y^T 1}$$

Thus a calibration relationship of the form $$m = f(m_0) \quad \text{(Equation 1)}$$

can be established through a least-squares polynomial fit between the centroids measured and the centroids calculated using all clearly identifiable isotope clusters available in the mass spectral standard across the mass range.

Note again $m_0$ does not have to be in mass unit (m/z) but rather any physical unit which ion intensities are measured as a function of. In FTMS and TOF, $m_0$ comes naturally in time units and the first and second order terms in the polynomial fit become dominant for FTMS and TOF, respectively.

In MS systems that contain significant background signals due to the presence of either chemical noise or other particles such as neutrals, it may be beneficial to fit a lower order baseline using only the collected data before and after the mass spectral peaks of interest and subtract this baseline contribution from $y_0$ to effect a more accurate determination of the centroid, $m_0$. It will become obvious later on, however, that it is not critical to have the absolute mass calibration at this stage due to the refinement that comes with the total calibration filters.

The description of mass spectral peak shape functions will now be given according to an illustrative embodiment of the present invention. For each mass spectral peak cluster (including all significant isotope peaks) identified such as the one shown in FIGS. 2A and 2B, a mass spectral peak shape function at this mass can be derived through the following deconvolution:

$$y_0 = y \otimes p$$

where $y_0$ is the actually measured isotope peak cluster, y is the theoretically calculated isotope distribution for the particular ion fragment around this mass, and p is the peak shape function to be calculated. While $y_0$ is an actually measured mass spectrum continuously sampled in a given mass window and can be easily converted through interpolation onto equally spaced mass intervals, the theoretically calculated isotope distribution is defined only on discrete and irregularly-spaced masses, such as the (m, y) shown above.

A key step in making this deconvolution possible is by numerically convoluting a narrow Gaussian peak to both $y_0$ and y before the deconvolution, i.e., $$(g \otimes y_0) = (g \otimes y) \otimes p \text{ or } y_0' = y' \otimes p \quad \text{(Equation 2)}$$

This pre-convolution allows for continuously sampling both $y_0$ and y onto the same equally spaced mass intervals. In order to minimize noise propagation through this pre-convolution, it is important to use a Gaussian peak whose peak width is several times (for example, 4 times) smaller than the FWHM of an individual isotope peak. FIGS. 3A and 3B are diagrams respectively illustrating the measured isotope cluster 310 before and after pre-convolution, according to an illustrative embodiment of the present invention. FIGS. 3C and 3D are diagrams respectively illustrating the calculated isotope cluster 320 before and after pre-convolution, according to an illustrative embodiment of the present invention. The pre-convolution can be accomplished through either matrix multiplication or Fast Fourier Transform (FFT) with zero filling, both well established in the open literature, for example, by William Press et al, in *Numerical Recipes in C*, $2^{nd}$ Ed, 1992, Cambridge University Press, p. 537, the entire disclosure of which is incorporated by reference herein.

Similar to pre-convolution, the deconvolution of y' from $y_0'$ to obtain peak function p can be accomplished through either matrix inversion or FFT division. Due to the banded nature of the matrix, efficient computational algorithms are available from the open literature for the matrix inversion. Such algorithms are further described by Gene Golub et al., in *Matrix Computations*, 1989, Johns Hopkins University Press, p. 149, the entire disclosure of which is incorporated by reference herein. Alternatively, the efficient deconvolution can also be carried out through FFT division. In either case, it is critical to have proper noise filtering in place to control the noise propagation during the deconvolution process. This can be accomplished by discarding small singular values in the matrix approach before inversion or by replacing the real and imaginary part of the FFT division with interpolated values whenever division by a small number is encountered. The discarding of small singular values is further described by Yongdong Wang et al, in *Anal. Chem.*, 1991, 63, 2750 and by Bruce Kowalski et al., in *J. Chemometrics*, 1991, 5, 129, the disclosures of both of which are incorporated by reference herein. FIGS. 3E and 3F are diagrams respectively illustrating the derived peak shape function 330 thus calculated and the corresponding deconvolution residual 340, according to an illustrative embodiment of the present invention. It is desired to have the proper noise filtering in place during the deconvolution such that the residual after the deconvolution is of a random nature with magnitude comparable to the expected noise level in the measured data $y_0$.

In MS systems that contain significant background signals due to the presence of either chemical noise or other particles such as neutrals, it may be beneficial to fit a lower order baseline using only the collected data before and after the mass spectral peaks of interest and subtract this baseline contribution from $y_0$ before the pre-convolution. The purpose of this baseline correction is to ensure that the baseline from actually measured match that of the theoretically calculated.

Figure 4:
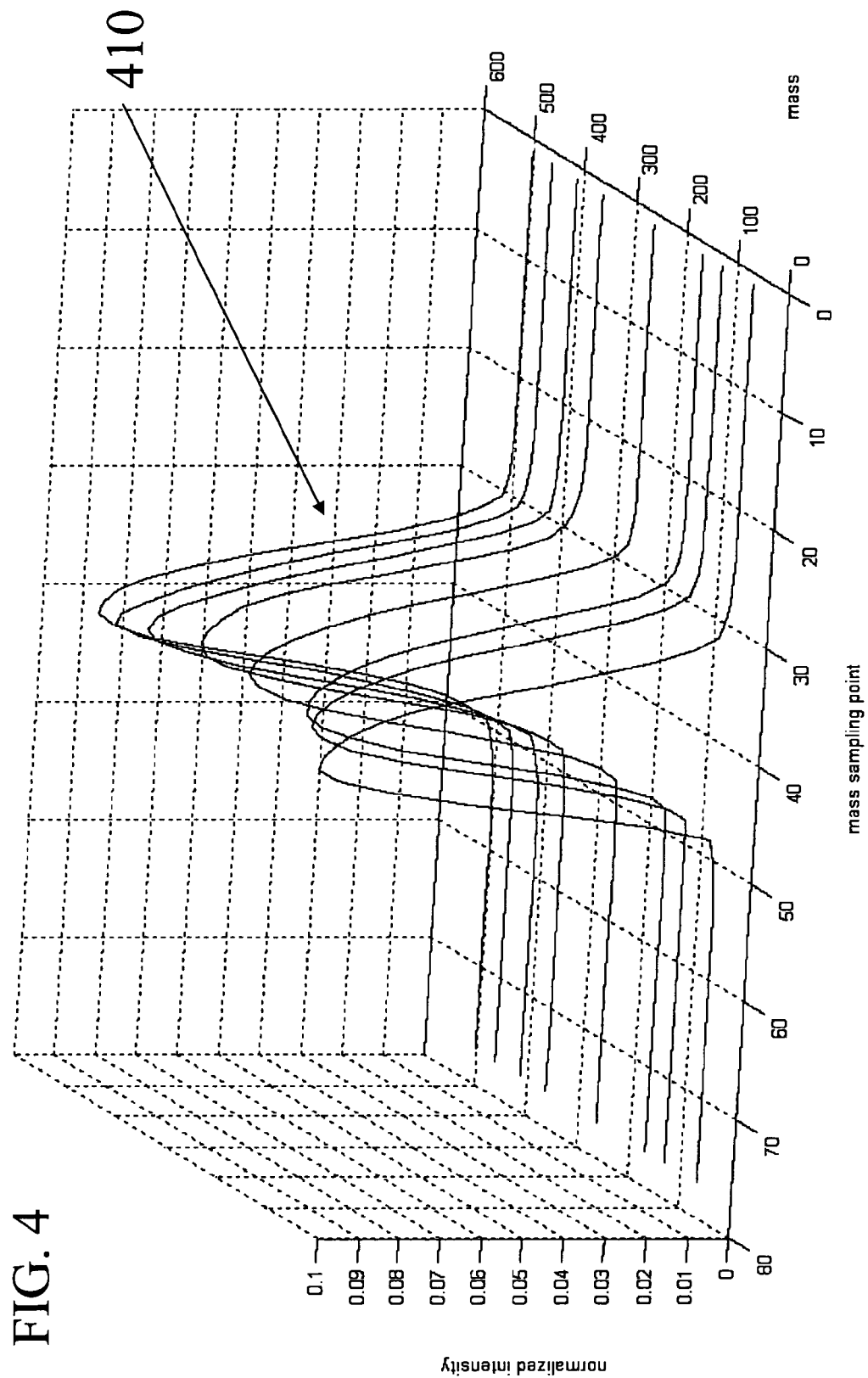
FIG. 4 is a diagram illustrating exemplary deconvoluted peak shape functions 410, according to an illustrative embodiment of the present invention.

The description of peak shape function interpolation will now be given according to an illustrative embodiment of the present invention. A few other peak shape functions can be calculated similarly from other well-characterized ion fragments across the mass spectral peak range from the mass spectrum of the same standard sample. FIG. 4 is a diagram illustrating exemplary deconvoluted peak shape functions 410, according to an illustrative embodiment of the present invention. In order to obtain peak shape functions for all other masses of interest within the mass spectral range, an interpolation on the few calculated peak shape functions will be required. An efficient interpolation algorithm that also allows for noise filtering is devised. Instead of interpolation in the original mass spectral space, these few available mass peak shape functions will be collected in a matrix P to be decomposed through Singular Value Decomposition (SVD) first, $$P = USV^T$$

where P is the peak shape function matrix with peak shape functions arranged in rows, U contains the left singular vectors in its columns, S is a diagonal matrix with descending singular values on the diagonal, and V contains the right singular vectors in its columns. SVD algorithm has been described by Gene Golub et al, in *Matrix Computations*, Johns Hopkins University Press, p. 427, the entire disclosure of which is incorporated by reference herein. Usually only a few (such as 3 to 4) singular values/vectors would be significant, depending on the consistency of peak shape functions as a function of mass. For example, if all peak shape functions are exactly the same with only minor mass shifts among them, one expects only two significant singular values/vectors. If all peak shape functions are identical to each other with no mass shift, one would expect only one singular value/vector. This explains why a pre-alignment step is needed above in order to result in a more economic decomposition and interpolation with minimal number of singular values/vectors involved.

Figure 5:
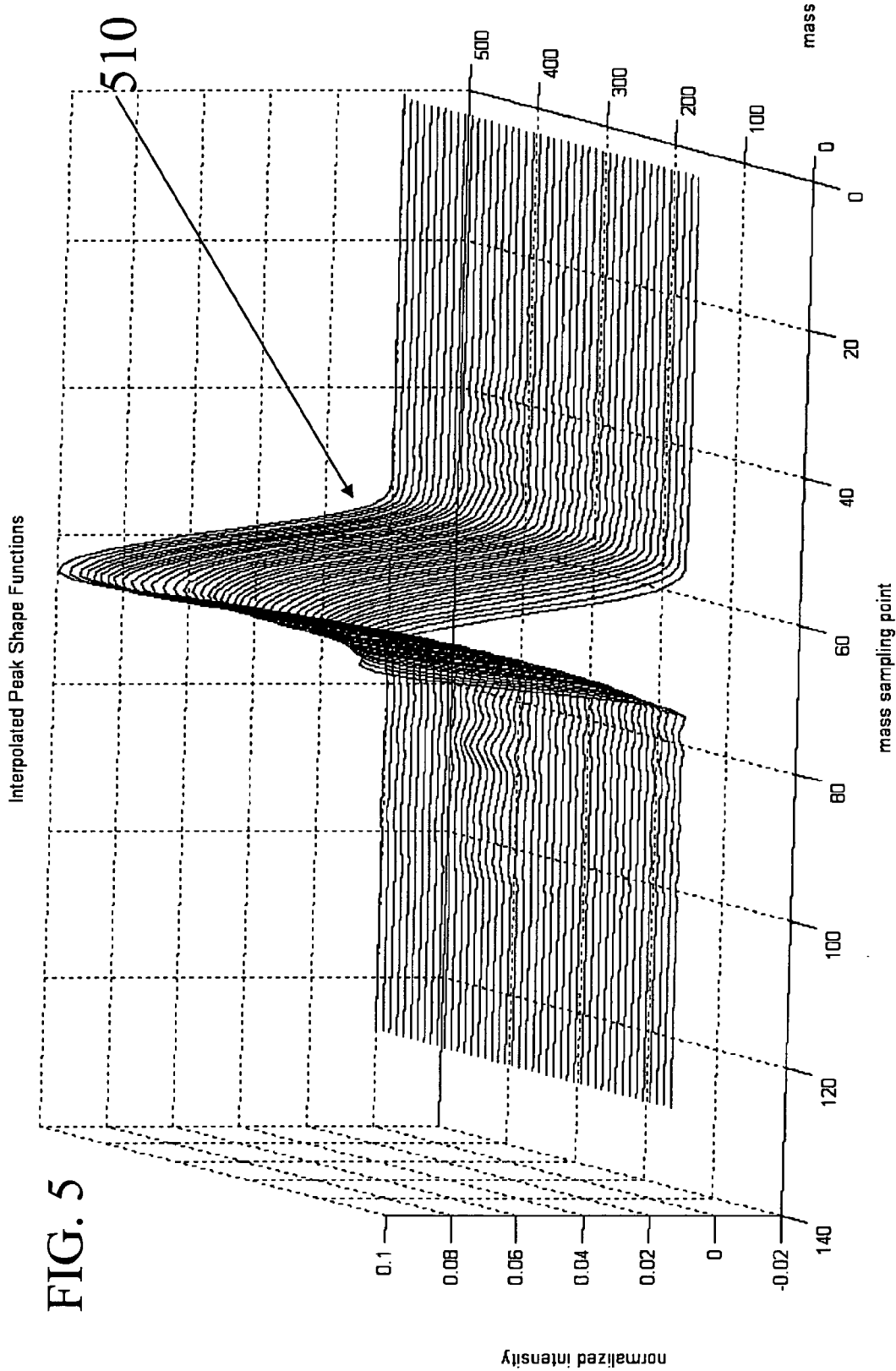
FIG. 5 is a diagram illustrating exemplary interpolated peak shape functions 510 based on the deconvoluted peak shape functions 410 of FIG. 4, according to an illustrative embodiment of the present invention.

When the elements of the left singular vectors are plotted against the mass, one expects a smooth dependence on the mass, a functional dependence amenable for accurate interpolation. A cubic spline interpolation can be easily applied to the first few columns in matrix U to obtain an expanded matrix U with many more number of rows that cover the full mass spectral range. An expanded peak shape function matrix P containing interpolated peak shape functions can be easily constructed via $$P = USV^T$$

where each row in P contains one peak shape function at any interpolated mass centroid. FIG. 5 is a diagram illustrating exemplary interpolated peak shape functions 510 based on the deconvoluted peak shape functions 410 of FIG. 4, according to an illustrative embodiment of the present invention.

It should be pointed out that the SVD decomposition here can also be replaced with other decompositions, such as wavelet decompositions, to arrive at similar results at a different computational cost.

The description of calibration filters and their interpolation will now be given according to an illustrative embodiment of the present invention. With the peak shape functions obtained, the MS instrument system is now fully characterized both in terms of its mass axis and its peak shape functions. Based on this characterization, a full mass spectral calibration can now be performed. This calibration will be carried out in a single operation where the peak shape functions at different masses will be converted into more desirable peak shape functions centered at exact mass locations (target peak shape functions). While any analytically or numerically calculated peak shape functions can in principle serve as target peak shape functions, it is desirable to have targets with the following properties: smooth peak functions and derivatives (for numerical stability); analytically calculatable functions and derivatives (for computational efficiency); symmetrical peak shapes (for accurate mass determination in later peak detection); resemble the true mass spectral peak shape (for simplified calibration filters); peak width (FWHM) slightly larger than actually measured peak width (for computational stability and signal averaging).

Figure 6:
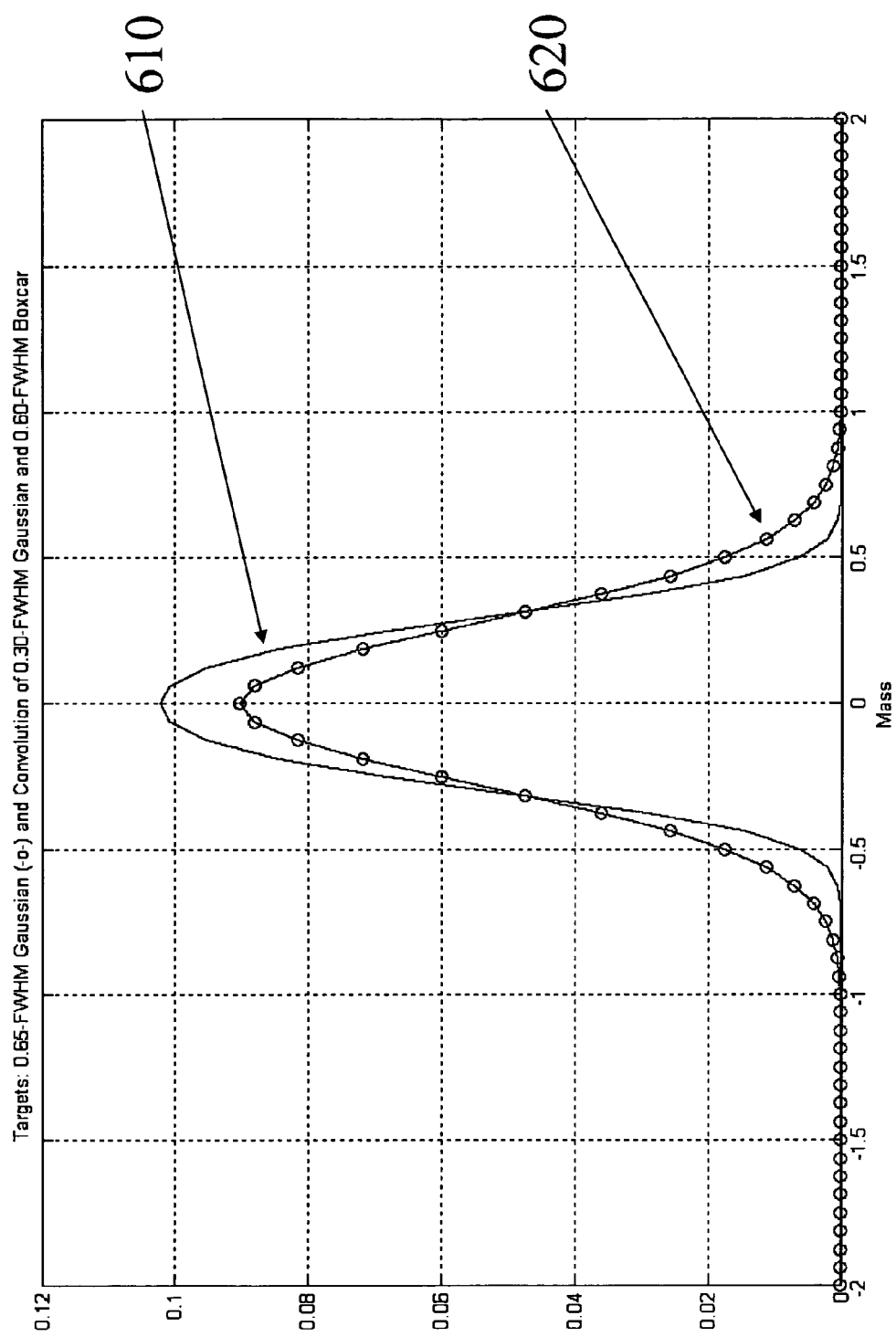
FIG. 6 is a diagram illustrating two exemplary targets 610, 620 that satisfy pre-specified requirements for mass spectrometry calibration, according to an illustrative embodiment of the present invention.

FIG. 6 is a diagram illustrating two exemplary targets 610, 620 that satisfy pre-specified requirements for mass spectrometry calibration, according to an illustrative embodiment of the present invention. The two exemplary targets 610 and 620 satisfy the requirements described above. The two exemplary targets 610 and 620 are a Gaussian and the convolution of a Gaussian and a boxcar, respectively.

Figure 7:
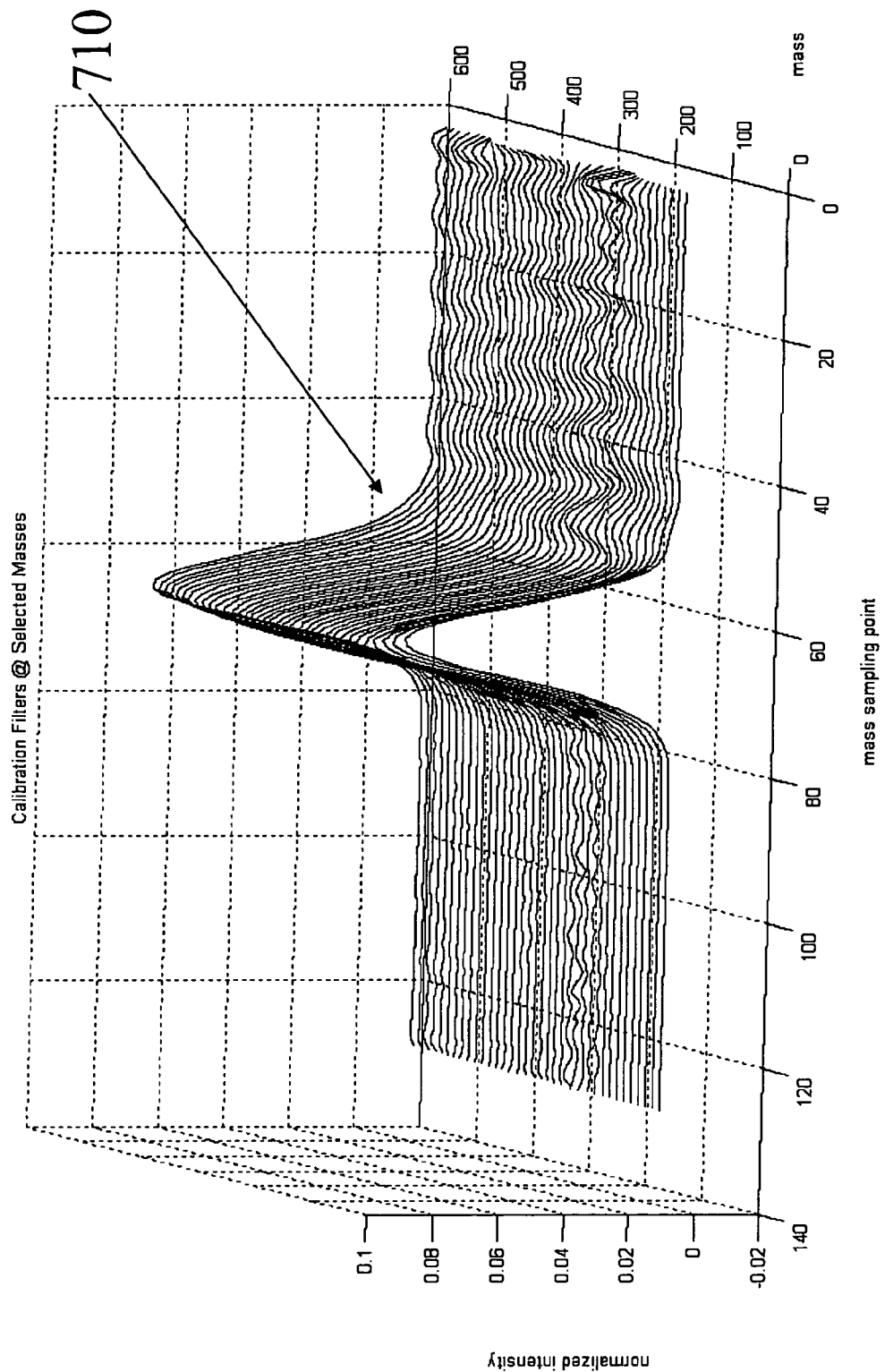
FIG. 7 is a diagram illustrating a collection 710 of calibration filters calculated for a set of masses, according to an illustrative embodiment of the present invention.

For each peak shape function p at a given centroid mass, a calibration filter f can be found such that:

$$t = p \otimes f \quad \text{(Equation 3)}$$

where t is the target peak shape function centered at this given mass. This convolution would essentially convert the numerically calculated peak shape function p into a mathematically defined peak shape function centered at this exact mass location, accomplishing both mass and peak shape calibration in one convolution operation. The calculation of calibration filter f can be carried out in similar fashion to the deconvolution of peak shape functions through either matrix inversion or FFT division with appropriate noise filtering built-in. FIG. 7 is a diagram illustrating a collection 710 of calibration filters calculated for a set of masses, according to an illustrative embodiment of the present invention.

It can be seen that the calibration filters vary smoothly with masses, similar to the peak shape functions. Since interpolation is computationally more efficient than deconvolution operation in general, it may be computationally advantageous to calculate the calibration filters at coarsely spaced masses across the whole range (for example, at every 1–5 amu spacing) and interpolate the calibration filters onto a finely spaced grid afterwards (for example, ⅛ or 1/16 amu). The same approach described above for the interpolation of peak shape functions can be applied. Alternatively, one can bypass the calculations of peak shape functions in Equation 2 all together and combine Equations 2 and 3 into a single-step process:

$$(t \otimes y) = y_0 \otimes f$$

where the convolution filters f at multiple standard masses can be calculated directly via matrix inversion or FFT division. An interpolation on these convolution filters will produce desired filters at specific masses (FIG. 7).

It should be noted that the calibration filters calculated here would serve two purposes simultaneously: the calibration of mass spectral peak shapes and mass spectral peak locations. Since the mass axis has already been pre-calibrated above, the mass calibration part of the filter function is reduced in this case to achieve a further refinement on mass calibration, i.e., to account for any residual mass errors after the polynomial fit given by Equation 1.

This total calibration process should work well for quadrupole-type MS including ion traps where mass spectral peak width (Full Width at Half Maximum or FWHM) is expected to be roughly consistent within the operating mass range. For other types of mass spectrometer systems such as magnetic sectors, TOF, or FTMS, the mass spectral peak shape is expected to vary with mass in a relationship dictated by the operating principle and/or the particular instrument design. While the same mass-dependent calibration procedure described so far is still applicable, one may prefer to perform the total calibration in a transformed data space consistent with a given relationship between the peak width/location and mass.

In the case of TOF, it is known that mass spectral peak width (FWHM) $\Delta m$ is related to the mass (m) in the following relationship:

$$\Delta m = a \sqrt{m}$$

where a is a known calibration coefficient. In other words, the peak width measured across the mass range would increase with the square root of the mass. With a square root transformation to convert the mass axis into a new function as follows:

$$m' = \sqrt{m}$$

where the peak width (FWHM) as measured in the transformed mass axis is given by $$\frac{\Delta m}{2\sqrt{m}} = \frac{a}{2}$$

which will remain unchanged throughout the spectral range.

For an FT MS instrument, on the other hand, the peak width (FWHM) $\Delta m$ will be directly proportional to the mass m, and therefore a logarithm transformation will be needed:

$$m' = \ln(m)$$

where the peak width (FWHM) as measured in the transformed log-space is given by $$\ln\left(\frac{m + \Delta m}{m}\right) = \ln\left(1 + \frac{\Delta m}{m}\right) \approx \frac{\Delta m}{m}$$

which will be fixed independent of the mass. Typically in FTMS, $\Delta m/m$ can be managed on the order of $10^{-5}$, i.e., $10^5$ in terms of the resolving power $m/\Delta m$.

For a magnetic sector instrument, depending on the specific design, the spectral peak width and the mass sampling interval usually follow a known mathematical relationship with mass, which may lend itself a particular form of transformation through which the expected mass spectral peak width would become independent of mass, much like the way the square root and logarithm transformation do for the TOF and FTMS.

When the expected mass spectral peak width becomes independent of the mass, due either to the appropriate transformation such as logarithmic transformation on FTMS and square root transformation on TOF-MS or the intrinsic nature of a particular instrument such as a well designed and properly tuned quadrupole or ion trap MS, huge savings in computational time will be achieved with a single calibration filter applicable to the full mass spectral range. This would also simplify the requirement on the mass spectral calibration standard: a single mass spectral peak would be required for the calibration with additional peak(s) (if present) serving as check or confirmation only, paving the way for complete mass spectral calibration of each and every MS based on an internal standard added to each sample to be measured.

The description of the application of the calibration filters will now be given according to an illustrative embodiment of the present invention.

The calibration filters calculated above can be arranged into the following banded diagonal filter matrix:

$$F = \begin{bmatrix} f_1 & & & \\ & \ldots & & \\ & & f_i & \\ & & & \ldots \\ & & & & f_n \end{bmatrix}$$

in which each short column vector on the diagonal, $f_i$, is taken from the convolution filter calculated above for the corresponding center mass. The elements in $f_i$ is taken from the elements of the convolution filter in reverse order, i.e., $$f_i = \begin{bmatrix} f_{i,m} \\ f_{i,m-1} \\ \vdots \\ f_{i,1} \end{bmatrix}$$

This calibration matrix will have a dimension of 8,000 by 8,000 for a quadrupole MS with mass coverage up to 1,000 amu at ⅛ amu data spacing. Due to its sparse nature, however, typical storage requirement would only be around 40 by 8,000 with an effective filter length of 40 elements covering a 5-amu mass range.

Figure 8:
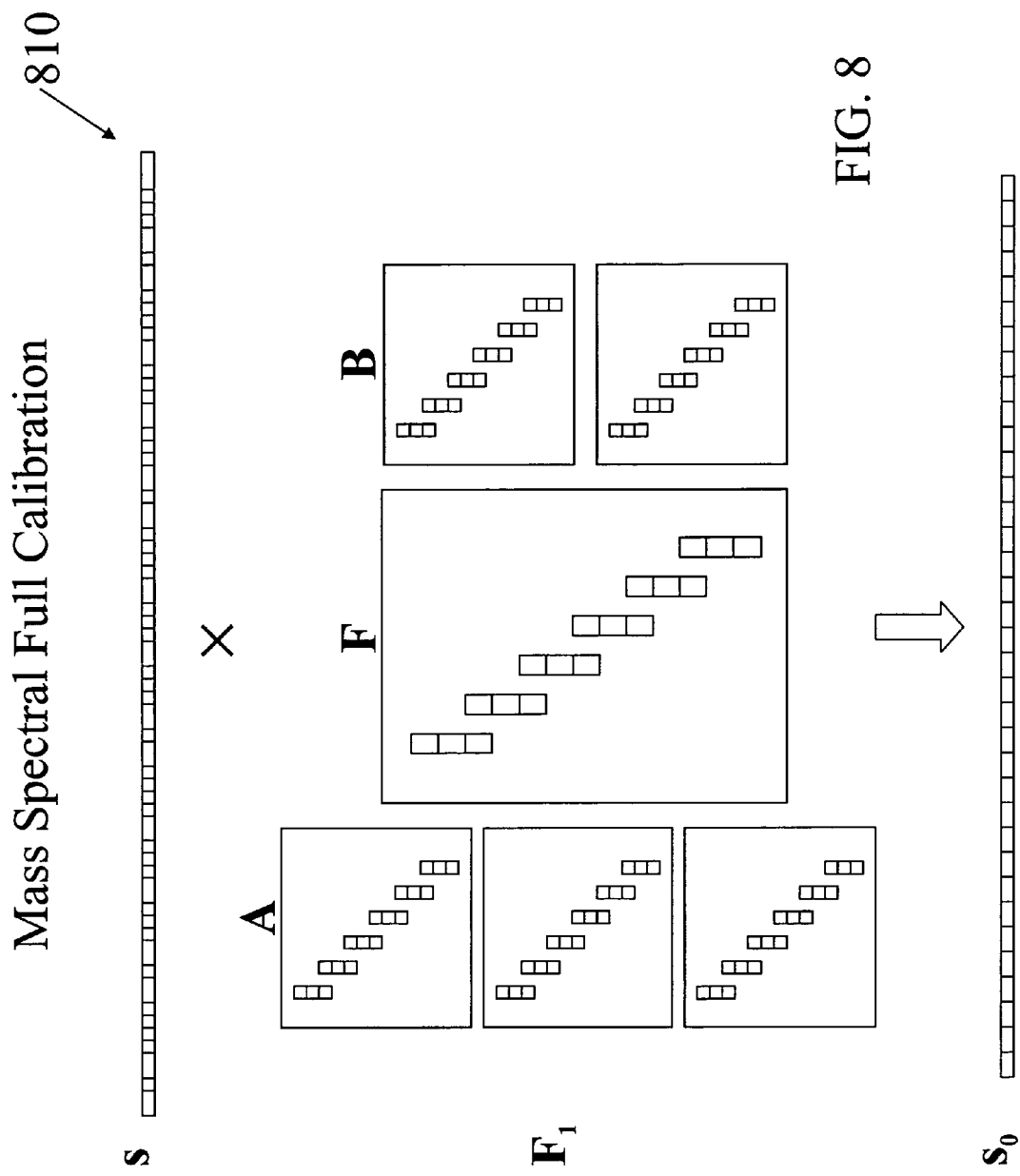
FIG. 8 is a diagram illustrating a graphical representation 800 of the filter matrix application combined with interpolations and mass pre-alignment, according to an illustrative embodiment of the present invention.

FIG. 8 is a diagram illustrating a graphical representation 800 of the filter matrix application combined with interpolations and mass pre-alignment, according to an illustrative embodiment of the present invention. There are three components to the total calibration: Pre-calibration matrix A; Calibration matrix F; and Post-calibration matrix B.

Pre-calibration matrix A takes on the form of a banded diagonal with each nonzero column along the diagonal performing an essentially interpolation function. This interpolation function can include: (a) conversion from non-uniformly spaced raw MS data into uniformly-spaced MS data; (b) pre-alignment of the mass axis; and (c) proper transformations for TOF, FTMS, or magnetic sector instruments.

Calibration matrix F is a banded diagonal matrix to perform both peak shape and mass axis calibration.

Post-calibration matrix B, similar to pre-calibration matrix A, takes on the form of a banded diagonal with each nonzero column along the diagonal performing another interpolation function. This interpolation function can include: (a) conversion from the internal uniform spacing into either uniform or nonuniform reported spacing; and (b) transform back into the linear mass space for TOF, FTMS, or magnetic sector instruments.

The factorization shown in FIG. 8 is made possible by Lagrange interpolation where the interpolation can be structured as a filtering operation independent of the y-values on which the interpolation operates. Lagrange interpolation algorithm is described by William Press et al, in *Numerical Recipes in C, 2$^{nd}$ Ed*, 1992, Cambridge University Press, p. 105, the entire disclosure of which is incorporated by reference herein. On instruments that output raw mass spectrum at predefined mass intervals, all three matrices can be pre-calculated as part of the calibration process and multiplied beforehand into an overall filtering matrix $$F_1 = AFB$$

which will have a banded structure similar to F with different elements. At runtime for each mass spectrum acquired, only one sparse matrix multiplication is required $$s_0 = sF_1$$

where s is a row vector containing raw MS data and $s_0$ is another row vector containing fully calibrated MS data at desired output spacing. The real time portion of this operation is expected to be computationally efficient as it is basically to filter the raw un-calibrated data into fully calibrated MS data for output. On some MS instruments, each mass spectrum is acquired at different and non-uniform mass intervals. In this case, the pre-calibration matrix A is different for each acquisition, with only F and B matrices fixed before the next calibration. These two matrices can be pre-multiplied with the following real time operation $$s_0 = sA(FB)$$

which will be computationally more expensive due to the extra interpolation or multiplication step for each acquisition.

It should be noted that in some instrument systems, it may be possible to carry out the full mass spectral calibration on each individual sample on-the-fly. For example, on FTMS or TOF, after the logarithm or square root transformation, only one deconvolution sequence is required for an MS peak (internal standard peak) through Equations 2 and 3 to construct a new banded diagonal matrix F with the identical nonzero elements contained in each column while both A and B may be kept unchanged. The full calibration thus developed could then be applied to the same original MS spectrum to effect a full calibration on all peaks (including the internal standard peak and other unknown peaks to be analyzed). The same on-the-fly calibration can be applied to other MS systems where the peak shape functions are effectively independent of the mass, requiring the minimum of one MS peak located anywhere within the mass range as the internal standard on which to derive the filter matrix F with identical nonzero elements along each column. The internal standard will be a selected compound having well characterized isotope clusters and can be added to each unknown sample during sample preparation steps beforehand or infused and mixed online with an unknown sample in real time.

One may carry out some parts of this full calibration through an updating algorithm to combine external standards (through a different MS acquisition) with internal standards (within the same MS acquisition) in a computationally efficient way. For example, one may apply the last available full calibration based on the most recently measured external standard to an unknown sample containing an internal standard peak. By checking the exact mass location and the peak shape of the internal standard after the calibration (see next section below for peak analysis), one may find that the peak shape has not changed and there exists only a minor mass shift. As a result, FB could be kept the same requiring only a small update on matrix A, which is fully capable of shift compensation.

The description of error propagation through the calibration filters will now be given according to an illustrative embodiment of the present invention.

In order to properly identify and quantify mass spectral peaks, it is important to estimate the variance in the calibrated MS data. For the majority of MS instruments, the random error on ion intensity measurement is dominated by ion counting shot noise, i.e., the variance in raw MS data is proportional to the ion signal itself. The variance spectrum of the calibrated MS spectrum $s_0$ is therefore given by $$\sigma^2 \propto sF_2 \qquad \text{(Equation 4)}$$

where $F_2$ is the same size as $F_1$ with all corresponding elements in $F_1$ squared. This turns out to be just one more filtering on the same raw MS data with all filter elements squared.

Figures 9A, 9B, 9C:
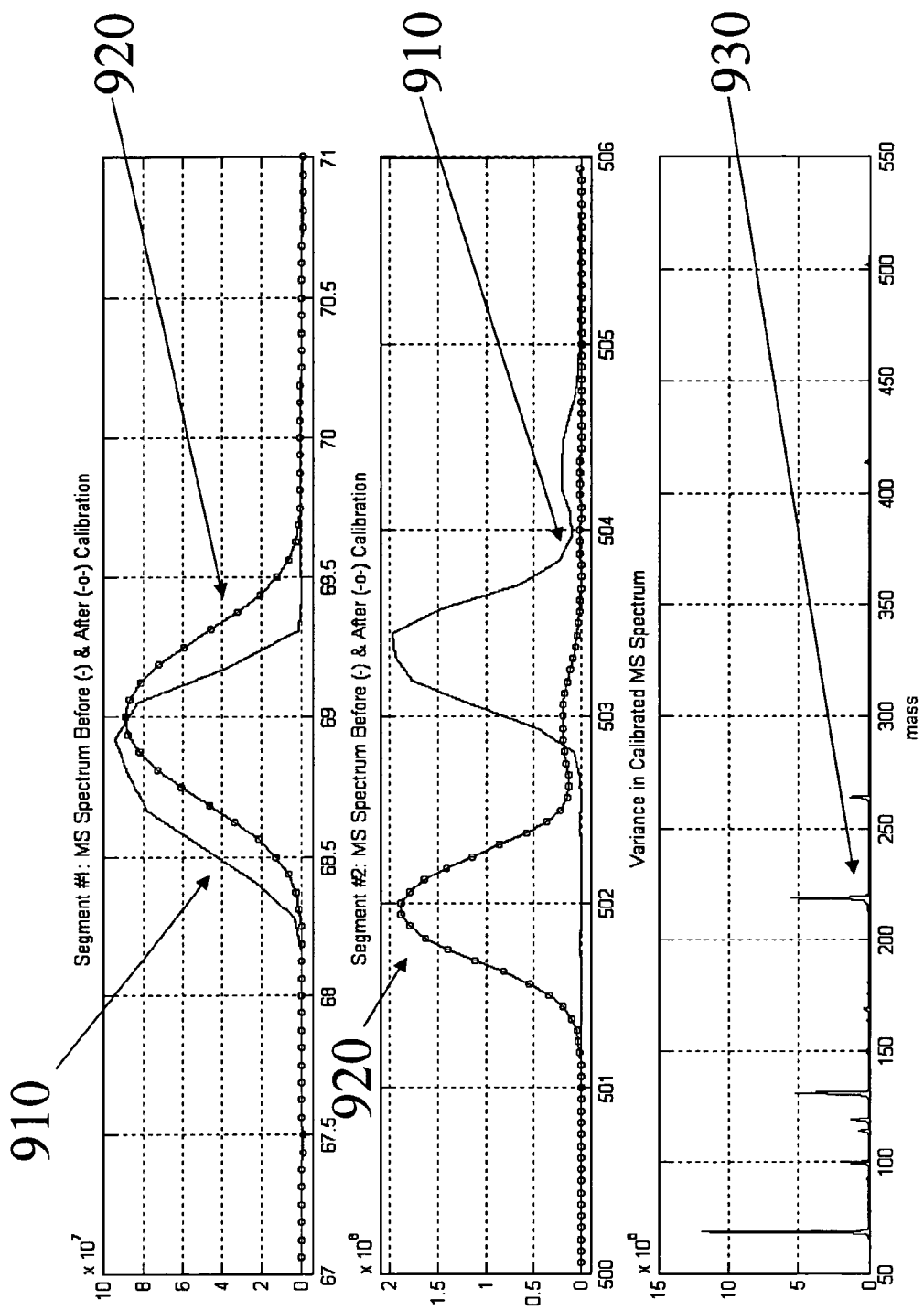
FIGS. 9A, 9B, and 9C are diagrams illustrating a first segment 910 and a second segment 920 of a Mass Spectrometry (MS) spectrum before and after full calibration (both FIGS. 9A and 9B) and the variance spectrum 930 (FIG. 9C), according to an illustrative embodiment of the present invention.

FIGS. 9A, 9B, and 9C are diagrams illustrating a first segment 910 and a second segment 920 of a Mass Spectrometry (MS) spectrum before and after full calibration (both FIGS. 9A and 9B) and the variance spectrum 930 (FIG. 9C), according to an illustrative embodiment of the present invention.

A description will now be given of mass spectral peak analysis according to an illustrative embodiment of the present invention. The description of mass spectral peak analysis will include descriptions relating to the following: peak matrix construction; Weighted Multiple Linear Regression (WMLR); detection of significant peaks; and refinement for peak analysis.

An MS spectrum after full calibration described above would be ideally suited for efficient, reliable, and highly sensitive peak detection. As will become clear later in this section, while peak analysis can be carried out in either the natural mass unit or the transformed unit (for FTMS or TOF or magnetic sector instruments), significant computational savings can be achieved to perform the mass spectral peak analysis in a transformed space (also referred to herein as "calibrated space") where peak shape functions are of the same width across the full mass range.

The description of peak matrix construction will now be given according to an illustrative embodiment of the present invention. The peak analysis problem is formulated as follows: a mass spectral trace is a linear combination of many peaks of known peak shapes located nominally at 1/z mass unit apart with peak center offsets reflecting mass defects. For singly charged ions (z=1), the nominal spacing would be 1 mass unit apart with some offsets in either positive or negative directions. The mass spectral peak analysis problem can then be formulated as a Multiple Linear Regression (MLR):

$$s_0 = cP + e \qquad \text{(Equation 5)}$$

where $s_0$ is a row vector containing the fully calibrated MS spectrum, P is the peak component matrix containing nominally spaced known peak functions (each with analytically integrated area of unity) in its rows, c is a row vector containing the integrated peak intensities for all nominally spaced peaks, and e is the fitting residual. To account for baseline contributions, baseline components such as offset, $1^{st}$ order linear term or other higher order nonlinear functional forms can be added into the rows of the P matrix with the corresponding row vector c augmented by the corresponding coefficients to represent the contributions (if any) of these baseline components.

Note that the full mass spectral calibration described above allows for analytically calculating the peak component matrix P in which all peaks would integrate to unit area analytically, leading to the corresponding estimates in c automatically reporting analytically integrated area, free from the interferences from other peaks (such as other isotope peaks) located nearby with automatic noise filtering and signal averaging (left in e). For the very same reason, it is also possible to perform unbiased isotope ratio measurement between nearby isotope peaks.

Furthermore, the construction of peak component matrix P can be made computationally more efficient by performing the above full MS calibration to output calibrated MS data at an exact fraction of the nominal mass spacing, for example, at ¼, ⅕, ⅛, 1/10, 1/12, 1/16 of 1 amu. This way, the peak shape function will only need to be evaluated once for one row in P with other rows formed by simply shifting this row forward or backward.

The description of Weighted Multiple Linear Regression (WMLR) will now be given according to an illustrative embodiment of the present invention. Since the error term e does not have uniform variance across the mass spectral range as indicated in the calibration section, a Weighted Multiple Linear Regression (WMLR) will need to be performed instead of the ordinary MLR, $$s_0 diag(w) = cPdiag(w) + e \quad \text{(Equation 6)}$$

where diag(w) is a diagonal matrix with the weights along the diagonal given by Equation 4, $$w = 1/\sigma^2 = 1/(sF_2)$$

where the shared proportional constant among all masses have been dropped with no impact on the regression.

A least squares solution to Equation 6 will give $$c = s_0 diag(w) P^T [Pdiag(w) P^T]^{-1} \quad \text{(Equation 7)}$$

and its variance estimated as $$s^2\{c\} = e^2 diag\{[Pdiag(w)P^T]^{-1}\} \quad \text{(Equation 8)}$$

where $e^2$ is based on the weighted squared deviations $$e^2 = ediag(w)e^T/df$$

with e given by the fitting residual in Equation 5 and df being the degrees of freedom, defined as the difference between the number of independent mass spectral data points and the number of rows included in matrix P (number of coefficients in c to be estimated). The least squares solution to Equation 6 is further described by John Neter et al., in *Applied Linear Regression*, 2$^{nd}$ Ed., Irwin, 1989, p. 418, the entire disclosure of which is incorporated by reference herein.

For an MS instrument with mass range reaching 1,000 amu with mass interval of ⅛ amu, the peak component matrix P will typically be 1,000 by 8,000 but largely sparse with no more than 40 nonzero elements (covering 5-amu mass range) in each peak row (baseline components have all nonzeros in the corresponding rows). The data storage efficiency can be drastically enhanced through indexing to take advantage of the fact that the peak components are merely shifted version of each other when sampled at exact fractions of a nominal mass interval. Computationally, gains can be had by pre-calculating both $s_0 diag(w) P^T$ and $[Pdiag(w)P^T]$ separately through sparse matrix operation. The pre-calculation of the latter term should result in another sparse symmetrical matrix of dimension 1,000 by 1,000 but with diagonal band-width of ~120 (nonzero elements in each row) and half band-width of ~60 (considering the symmetry) in the above example.

In the absence of baseline components with identical and symmetrical peak shape functions across the whole mass range, the above operation will lead to a sparse matrix $[Pdiag(w)P^T]$ which will have a block cyclic structure amenable for a computationally efficient inversion into $[Pdiag(w)P^T]^{-1}$ through block cyclic reduction. Block cyclic reduction is described by Gene Golub et al, in *Matrix Computations*, 1989, Johns Hopkins University Press, p. 173, and by William Press et al, in *Numerical Recipes in C*, 2$^{nd}$ Ed, 1992, Cambridge University Press, p. 71, the disclosures of both of which are incorporated by reference herein.

Even in the presence of baseline components with varying and non-symmetrical peak shape functions across the mass range, the sparse matrix $[Pdiag(w)P^T]$ will have the following special form (assuming three baseline components from offset, 1$^{St}$, to 2$^{nd}$ order, for example):

$$\begin{bmatrix} \times & \times & \times & \times & \times & \times & \times \\ \times & \times & \times & \times & \times & \times & \times \\ \times & \times & \times & \times & \times & \times & \times \\ \times & \times & \times & \times & & & \\ \times & \times & \times & \times & \times & \times & \\ \times & \times & \times & & \times & \times & \times \\ \times & \times & \times & & & \times & \times \end{bmatrix}$$

which can be solved efficiently as a block diagonal system. Block diagonal systems are described by Gene Golub et al, in *Matrix Computations*, 1989, Johns Hopkins University Press, p. 170, the entire disclosure of which is incorporated by reference herein.

When the true mass spectral peaks do not coincide exactly with nominal masses, one has the following linear combination equations (ignoring any baseline components for simplicity here without loss of generality), $$s_0 = \Sigma c_i P_i + e = \Sigma c_i P_i(m_i) + e$$

where peak shape function $p_i$ with center mass $m_i$ can be expanded to 1$^{st}$ order in Taylor series as $$p_i(m_i) = p_i(m_{i0} + \Delta m_i) \approx p_i(m_{i0}) + \Delta m_i \frac{dp_i(m_{i0})}{dm}$$

with $p_i(m_i)$ being the peak shape function centered at the true mass location $m_i$, $p_i(m_{i0})$ being the peak shape function centered at the nominal mass location $m_{i0}$ close to $m_i$, $\Delta m_i$ being the difference between the true and nominal mass location (mass defect or deviation from nominal mass due to multiple charges), and $dp_i(m_{i0})/dm$ being the analytically calculated 1$^{st}$ derivative of the peak shape function centered at nominal mass $m_{i0}$.

Talking into account of the mass defect, one has the following modified equation $$s_0 = \sum c_i p_i + e = \sum c_i p_i(m_{i0}) + \sum (c_i \Delta m_i) \frac{dp_i(m_{i0})}{dm} + e = \sum c_i p_i(m_{i0}) + \sum c_{n+i} \frac{dp_i(m_{i0})}{dm} + e$$

where $c_{n+i} = c_i \Delta m_i$ and n is the number of nominal masses under consideration. Written back into matrix form, one has $$s_0 = cP + e \quad \text{(Equation 9)}$$

where both c and P are augmented now by the coefficients in front of the derivative terms and the derivative terms themselves. It is important to note that because the peak shape functions are chosen to be symmetrical (and therefore orthogonal to the peak shape functions themselves), the inclusion of their derivatives has no adverse effects on the condition of the peak component matrix P, leading to the most precise mass determination and the most repeatable peak integration.

The same WMLR described above can be applied to solve Equation 9 and arrive at the integrated peak areas $c_1, c_2, , c_n$. In addition, Equation 8 can be used to calculate a standard deviation for each peak area thus obtained, leading to elegant statistical measures on the quality of these peak areas.

An improved determination of the center mass locations can be obtained $$m_i = m_{i0} + \Delta m_i = m_{i0} + c_{n+i}/c_i \quad \text{(Equation 10)}$$

where the relative error in $\Delta m_i$ determination is given by $$|s(\Delta m_i)/\Delta m_i| = |s(c_i)/c_i| + |s(c_{n+i})/c_{n+i}|$$

with standard deviations for $c_i$ and $C_{i+n}$ available from Equation 8 directly. In other words, the standard error for shift estimate is $$s(\Delta m_i) = [|s(c_i)/c_i| + |s(c_{n+i})/c_{n+i}|]|\Delta m_i|$$

which is also the standard error for the center mass given in Equation 10.

The description of the detection of significant peaks will now be given according to an illustrative embodiment of the present invention. Based on the peak area estimation (Equation 7) and its standard deviation calculation (Equation 8) from the last section, t-statistic can be calculated $$t_i = c_i/s(c_i) \text{ for } i=1, 2, \ldots, n$$

which can be combined with the degree of freedom (df) to statistically detect whether the concentration estimate $c_i$ is significantly above zero or not, i.e., the presence or absence of a mass spectral peak. Typically the df is large enough to be considered infinite and a t-statistic of more than 3.0 or other user-selected cutoff values indicates the statistically significant presence of a mass spectral peak. It is noted that a t-statistic cutoff higher than the usual 3.0 value may be needed to account for the fact that individual mass spectral points after the full calibration depicted in FIG. 8 will no longer be statistically independent but become correlated in its noise. Realistic cutoff values can be established through either computer simulation or practical experience.

FIG. 10A is a diagram illustrating a stick spectrum 1010 reflecting the t-statistic as a function of the exact mass locations (Equation 10) for possible mass spectral peaks across the mass range (raw mass spectrum taken from FIG. 1), according to an illustrative embodiment of the present invention. FIGS. 10B and 10C are diagrams illustrating the overlay 1020 of the raw MS spectral segment and its fully calibrated version 1030, according to an illustrative embodiment of the present invention. FIG. 10D is a diagram illustrating the corresponding t-statistic 1040 and a horizontal cutoff line 1050 with critical t values set at 2, according to an illustrative embodiment of the present invention. The high degree of simultaneous noise filtering/signal averaging and peak shape calibration can be clearly seen in FIG. 10B, which greatly facilitates the peak analysis with highly sensitive results shown in FIG. 10D, where the detection is only limited by the random noise in the data with no artifacts or other sources of systematic errors.

The mass spectral peaks with its t-statistic above the cutoff will then be reported as statistically significant while those below the cutoff will be reported as not significant. Along with the t-statistic, the exact mass locations and the integrated peak areas can also be reported for the identification and quantification of particular molecules having the corresponding ion fragments. While F-statistic could have been more rigorously applied here, it is believed that the marginal t-statistic would be sufficient due to the minimal interactions (small co-variances) between the peak components. Multicollearity and the application of F-statistic are further described by John Neter et al., in *Applied Linear Regression*, 2$^{nd}$ Ed., Irwin, 1989, p. 300, the entire disclosure of which is incorporated by reference herein.

The description of the refinement for peak analysis will now be given according to an illustrative embodiment of the present invention. When higher degree of mass accuracy is desired, one may construct an iterative peak analysis process by treating the results obtained above as initial estimates, and update the peak component matrix P using the newly calculated center mass locations from Equation 10. Since the updated mass locations would not be spaced one nominal mass unit apart for each other, each peak component and its derivative form in P will need to be separately calculated analytically for all peaks of significance (based on the t-test described above). With the new P matrix constructed, new estimates for the c can be calculated, giving another update on the center mass locations:

$$m_i^{(k)} = m_i^{(k-1)} + \Delta m_i^{(k)} = m_i^{(k-1)} + c_{n+i}^{(k)}/c_i^{(k)}$$

where k=1, 2, . . . and $m_i^{(0)} = m_{i0}$ (nominal center mass locations). This iterative improvement will be completed when the incremental update $c_{n+i}^{(k)}$ becomes comparable to the standard deviation predicted from Equation 8. With such refinement implemented, extremely high mass accuracy can be achieved for strong mass spectral peaks due to the high signal to noise available for such peaks, for example, 2 ppm mass accuracy for the peak at mass 69 in FIG. 1. The mass accuracy will deteriorate as the peak intensity drops due to the decreased number of ions available for detection. In other words, the mass accuracy will be limited only by the random noise in the data but not by other artifacts or systematic errors, such as the presence of chemical noise, interference from the isotope peaks, irregular peak shapes, or unknown baselines, as these artifacts would have been fully compensated for by the calibration and peak analysis approaches taken here.

A description will now be given of some of the many attendant advantages and features of the present invention. The present invention provides a method for processing mass spectrometry data that is mathematically elegant, statistically sound, and physics-based. Beneficially, the present invention considers the presence of noise and isotope peaks as additional useful information in the overall scheme. The present invention handles noise, isotope distribution, multiple charges, baselines, peak identification, peak positioning, and peak quantitation, all simultaneously in one integrated process. The present invention combines occasional MS calibration with routine MS data analysis, and can drastically improve mass accuracy for either high- or low-resolution MS systems. On conventional MS systems with unit mass resolution (FWHM=0.5–0.7 amu), mass accuracy of 1–5 ppm level can be achieved. The present invention includes built-in baseline determination, noise filtering/signal averaging, and peak integration. The present invention is computationally efficient such that it can be employed for on-the-fly data reduction on GC/MS or LC/MS or other time-dependent MS detection systems. The present invention has output statistics for instrument diagnostics and data quality control. Moreover, the present invention involves all linear operators with predictable behaviors towards noise and other artifacts. The present invention achieves high mass precision for strong peaks and high sensitivity for weak peaks with wide dynamic range coverage. The present invention allows for the standardization of all different (types) of MS instruments and for universal highly accurate library searches. This allows for molecular fingerprinting at much reduced cost in complex matrices even w/o the need for separation due to the high mass accuracy achievable.

While above mass spectral calibration and peak analysis have been described for typical mass spectrometry systems having at least unit mass resolution, it is further appreciated that even for low resolution mass spectrometry systems that do not differentiate peaks located within unit masses, the above mass spectral calibration brings significant and intrinsic advantages. In low resolution mass spectrometry systems, no explicit peak identification is feasible due to the lack of spectral resolution. Instead of the conventional peak analysis including peak identification and quantification, the complete mass spectral trace is used as input to multivariate statistical analysis for either analyte quantification through multivariate calibration or sample classification through cluster analysis or pattern recognition. These multivariate statistical approaches include Principal Component Analysis (PCA) or Principal Component Regression (PCR), as described by Bruce Kowalski et al, in *J Chemometrics*, 1991, 5, 129, the entire disclosure of which is incorporated by reference herein. One key factor for the successful application of these multivariate statistical approaches is the high mass accuracy and consistent peak shape functions between samples and instruments, as described by Yongdong Wang et al, in *Anal. Chem.*, 1991, 63, 2750, the entire disclosure of which is incorporated by reference herein. The complete mass spectral calibration introduced by this invention should properly align both the mass axes and mass spectral peak shape functions between different samples or instruments to allow for highly accurate multivariate spectral comparison for the purpose of either analyte quantification or sample classification (as used in biomarker discovery).

Figure 11:
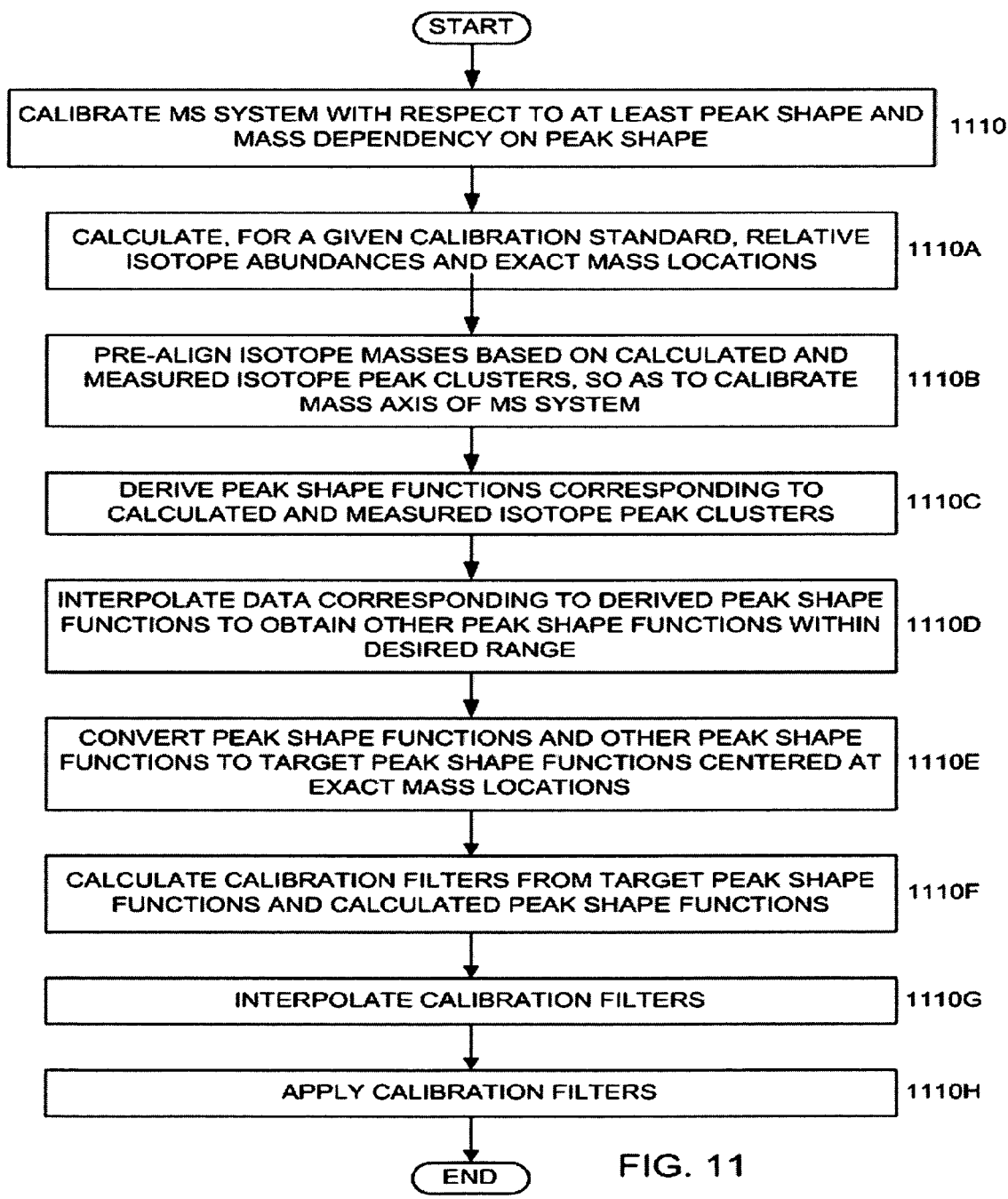
FIG. 11 is a diagram illustrating a method for operating a Mass Spectrometry (MS) instrument system, according to an illustrative embodiment of the present invention.

FIG. 11 is a diagram illustrating a method for operating a Mass Spectrometry (MS) instrument system, according to an illustrative embodiment of the present invention. The MS instrument system is calibrated with respect to at least peak shape and mass axis (step 1110). It is to be appreciated that step 1110 can be broken down into steps 1110A–1110G below.

It is to be further appreciated that steps 1110E–1110H are optional. If steps 1110E–1110H are performed, then the method of FIG. 13 may be performed subsequent to the method of FIG. 11. However, if steps 1110E–1110H are omitted, then the method of FIG. 14 may be performed subsequent to the method of FIG. 11.

At step 1110A, relative abundances and exact mass locations of the isotopes are calculated for a given calibration standard.

At step 1110B, isotope masses are pre-aligned based on calculated isotope peak clusters and measured isotope peak clusters corresponding to the calibration standard, so as to calibrate a mass axis of the MS instrument system.

At step 1110C, peak shape functions are derived corresponding to the calculated and measured isotope peak clusters.

At step 1110D, data corresponding to the derived peak shape functions is interpolated to obtain other peak shape functions within desired mass ranges. Each of the derived peak shape functions and the other peak shape functions correspond to the actually measured mass locations.

At step 1110E, the peak shape functions and the other peak shape functions are converted to target peak shape functions centered at exactly the mid-point in the desired mass ranges.

At step 1110F, calibration filters are calculated from the target peak shape functions and the calculated peak shape functions.

At step 1110G, the calibration filters are interpolated onto a finer grid.

At step 1110H, the calibration filters are applied so as to calibrate the MS instrument system.

Figure 12:
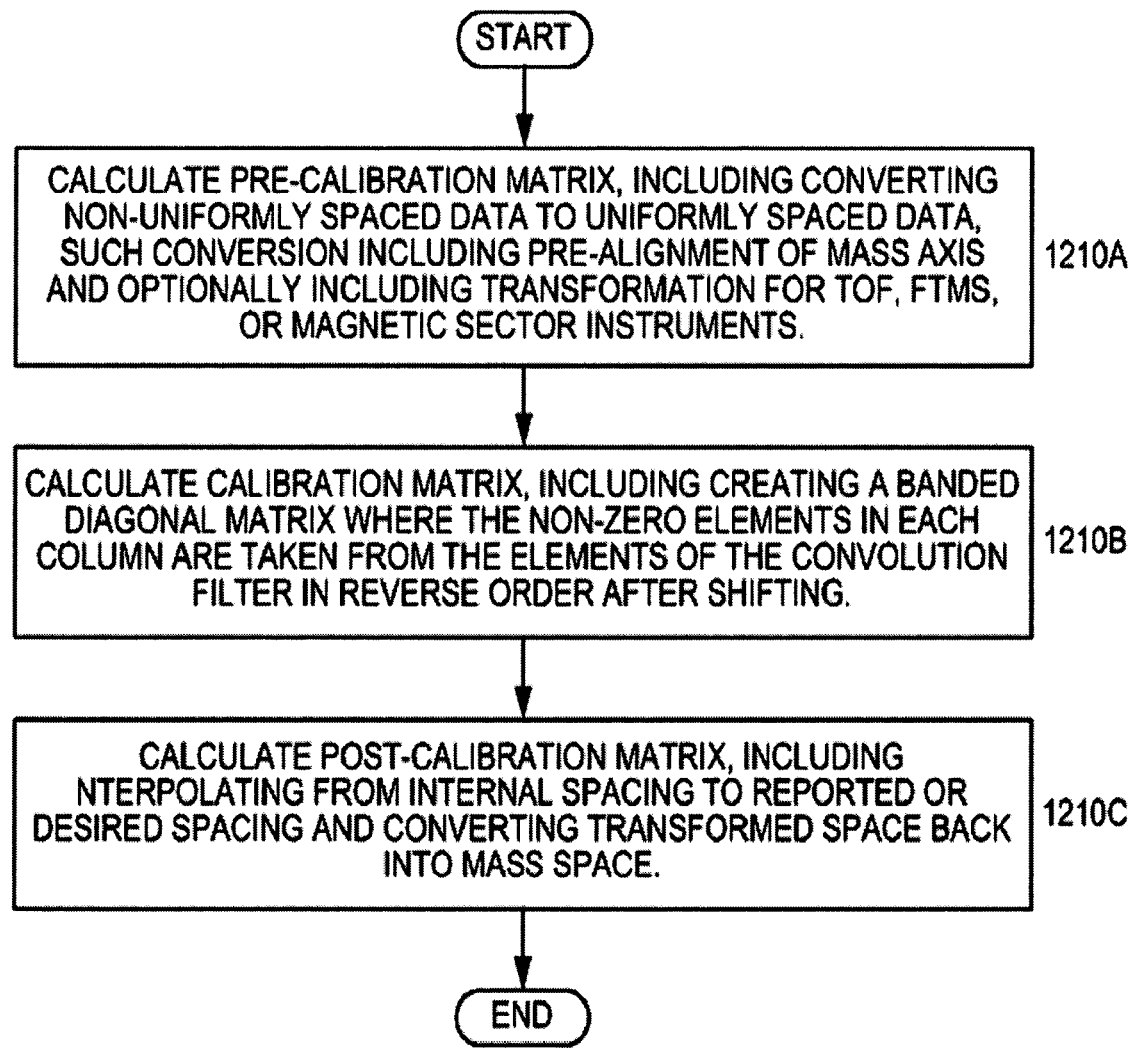
FIG. 12 is a diagram further illustrating step 1110H of the method of FIG. 11, according to an illustrative embodiment of the present invention.

FIG. 12 is a diagram further illustrating step 1110H of the method of FIG. 11, according to an illustrative embodiment of the present invention. Step 1110H includes steps 1210A–1210C below.

At step 1210A, a pre-calibration matrix is calculated. Calculation of the pre-calibration matrix includes converting non-uniformly spaced data to uniformly spaced data, such conversion including pre-alignment of mass axis and optionally including transformation for TOF, FTMS, or magnetic sector instruments.

At step 1210B, a calibration matrix is calculated. The calculation of the calibration matrix includes creating a banded diagonal matrix where the non-zero elements in each column are taken from the elements of the convolution filter in reverse order after shifting.

At step 1210C, a post-calibration matrix is calculated. The calculation of the post-calibration matrix includes interpolating from internal spacing to reported or desired spacing and converting transformed space back into original mass space.

Figure 13:
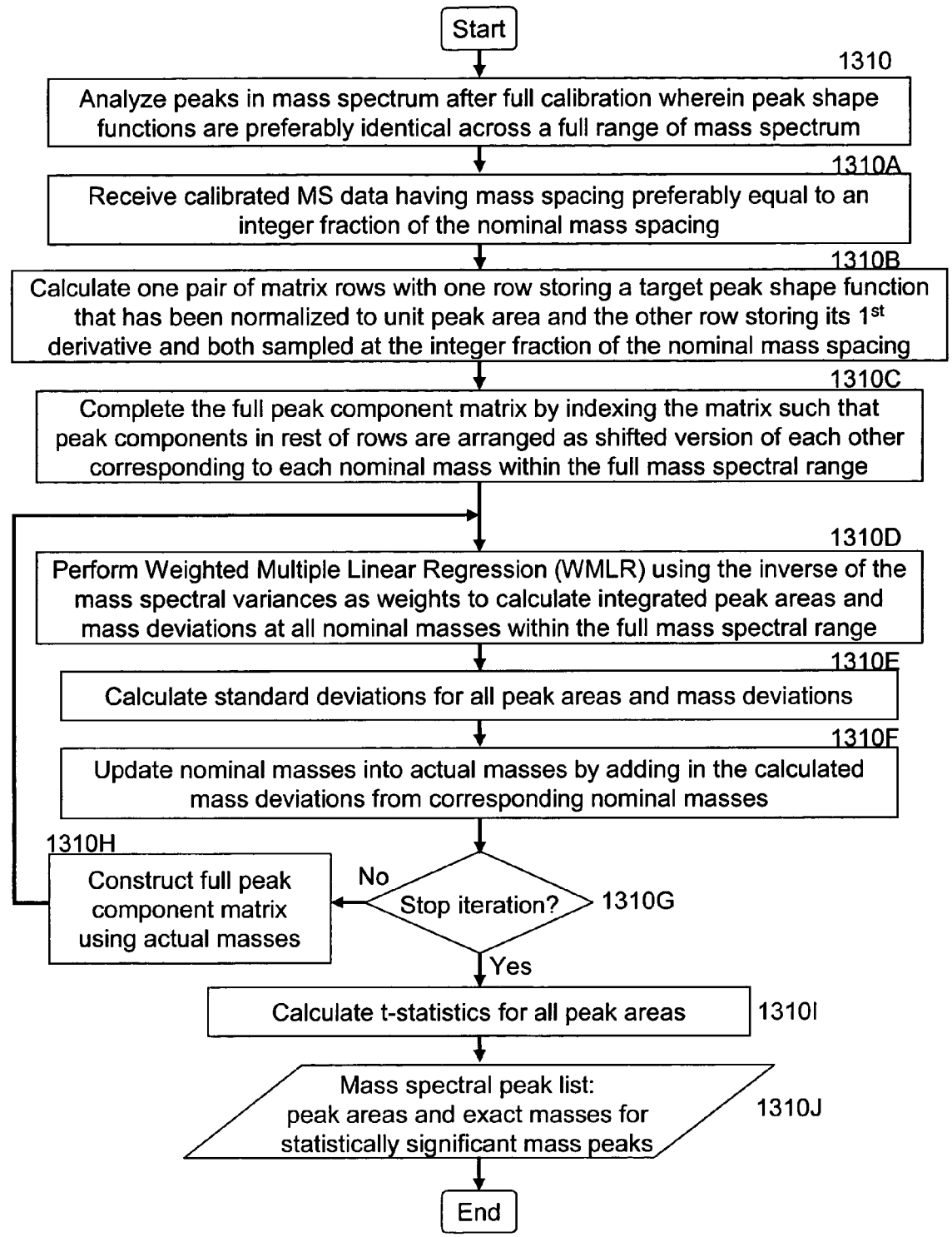
FIG. 13 is a diagram illustrating a method for analyzing a Mass Spectrometry (MS) spectrum obtained from an MS instrument system after the full mass spectral calibration, according to an illustrative embodiment of the present invention.

FIG. 13 is a diagram illustrating a method for analyzing a Mass Spectrometry (MS) spectrum obtained from an MS instrument system, according to an illustrative embodiment of the present invention.

Peaks in the MS spectrum are analyzed after full calibration (step 1310). It is preferable, but not necessary, that the peak shape functions are identical across a full range of mass spectrum.

Calibrated MS data having a mass spacing preferably equal to an integer fraction (e.g., $\frac{1}{4}$, $\frac{1}{5}$, $\frac{1}{8}$, $\frac{1}{10}$, $\frac{1}{12}$, $\frac{1}{16}$) of the nominal mass spacing (e.g., 1 amu) is received (step 1310A).

One pair of matrix rows of a full peak component matrix is calculated, such that one row of the pair stores a target peak shape function that has been normalized to unit peak area and the other row of the pair stores the first derivative of the target peak shape function stored in the one row of the pair, and such that both the target peak shape function and its first derivative have been sampled at the integer fraction of the nominal mass spacing (step 1310B).

The full peak component matrix is completed by indexing the matrix such that peak components in the remainder of the rows are arranged as shifted versions of each other corresponding to each nominal mass within the full mass spectral range (step 1310C).

A Weighted Multiple Linear Regression (WMLR) operation is performed using the inverse of the mass spectral variances as weights to calculate integrated peak area and mass deviations at all nominal masses within the full mass spectral range (sep 1310D).

Standard deviations are calculated for all peak areas and mass deviations (step 1310E).

Nominal masses are updated into actual masses by adding in the calculated mass deviations from corresponding nominal masses (step 1310F).

The performing (step 1310D), calculating (1310E) and updating (1310F) steps are repeated until any incremental improvements in either the peak areas or the mass deviations are smaller than corresponding standard deviations or other preset criteria (step 1310G). If the incremental improvements in either the peak areas or the mass deviations are not smaller than the corresponding standard deviations or other preset criteria, then the full peak component matrix is constructed using the actual masses (step 1310H), and the method returns to step 1310D. Otherwise, the method proceeds to step 1310I.

T-statistics are calculated for all of the peak areas (step 1310I), to obtain a mass spectral peak list that includes peak area and exact masses for statistically significant mass peaks (step 1310J).

Figure 14:
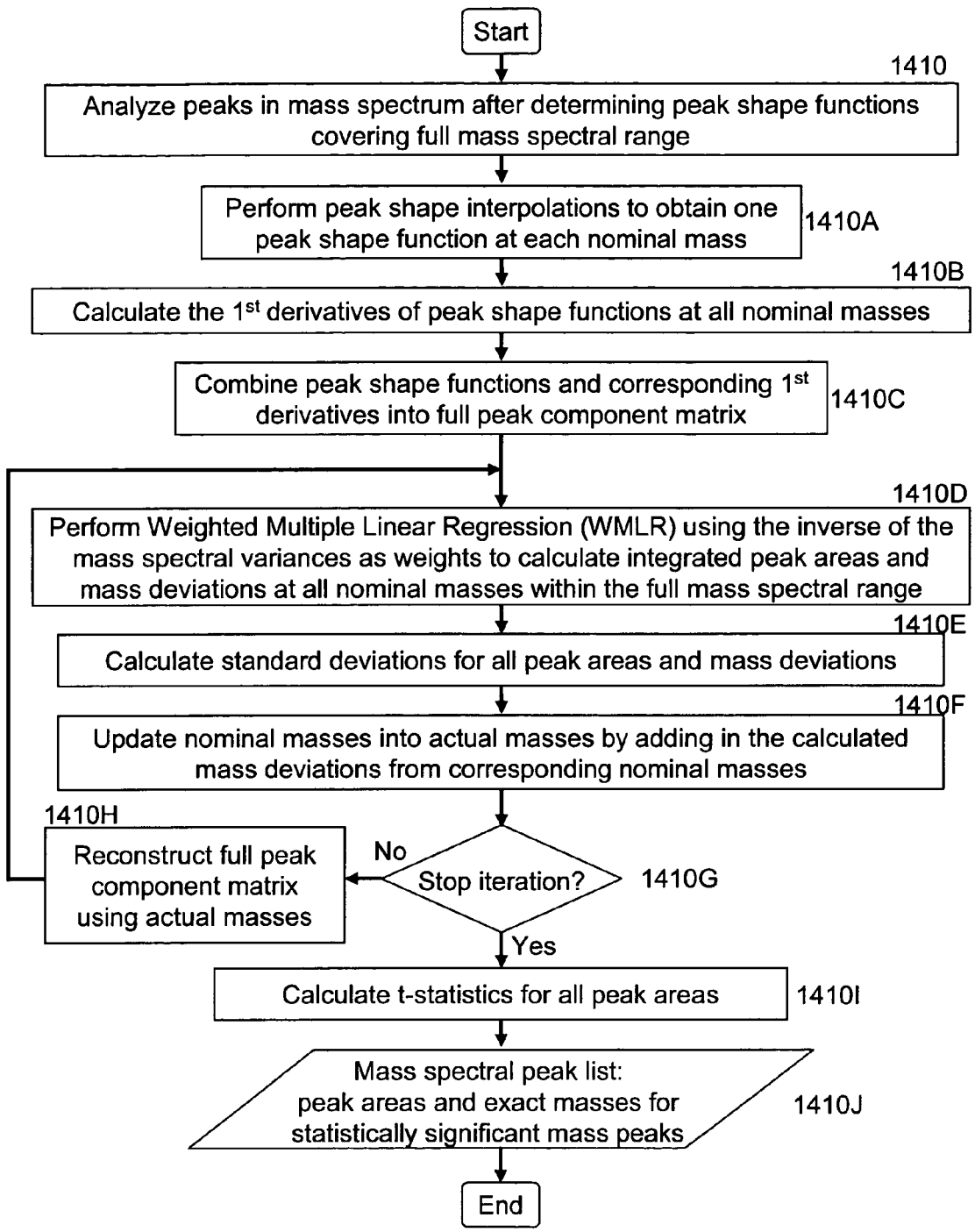
FIG. 14 is a diagram illustrating a method for analyzing a Mass Spectrometry (MS) spectrum obtained from an MS instrument system after determination of peak shape functions, according to an illustrative embodiment of the present invention.

FIG. 14 is a diagram illustrating a method for analyzing a Mass Spectrometry (MS) spectrum, according to an illustrative embodiment of the present invention.

Peaks in the MS spectrum are analyzed after determining peak shape functions covering the full mass spectral range (step 1410). Peak shape interpolations are performed to obtain one peak shape function at each nominal mass (step 1410A).

First derivatives of the peak shape functions are calculated at all nominal masses (step 1410B). Peak shape functions and the corresponding first derivatives are combined into a full peak component matrix (step 1410C).

A Weighted Multiple Linear Regression (WMLR) operation is performed using the inverse of the mass spectral variances as weights to calculate integrated peak area and mass deviations at all nominal masses within the full mass spectral range (sep 1410D).

Standard deviations are calculated for all peak areas and mass deviations (step 1410E).

Nominal masses are updated into actual masses by adding in the calculated mass deviations from corresponding nominal masses (step 1410F).

The performing (step 1410D), calculating (1410E) and updating (1410F) steps are repeated until any incremental improvements in either the peak areas or the mass deviations are smaller than corresponding standard deviations or other preset criteria (step 1410G). If the incremental improvements in either the peak areas or the mass deviations are not smaller than the corresponding standard deviations or other preset criteria, then the full peak component matrix is reconstructed using the actual masses (step 1410H), and the method returns to step 1410D. Otherwise, the method proceeds to step 1410I.

T-statistics are calculated for all of the peak areas (step 1310I), to obtain a mass spectral peak list that includes peak area and exact masses for statistically significant mass peaks (step 1410J).

Figure 15:
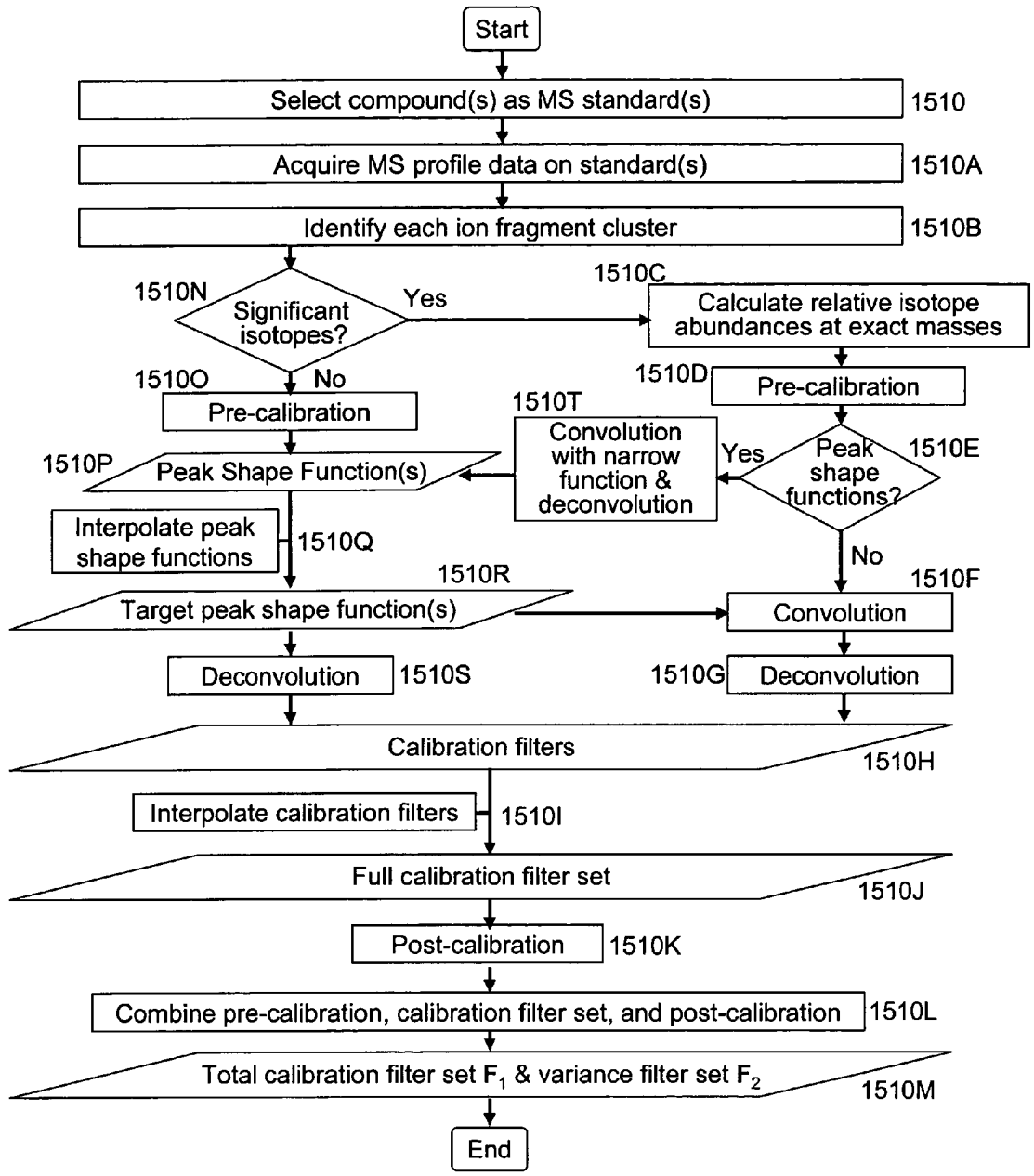
FIG. 15 is a diagram further illustrating the method of FIG. 11 including optional steps for calibrating Mass Spectrometry (MS) system, according to an illustrative embodiment of the present invention.

FIG. 15 is a flow diagram illustrating a method for creating calibration filters for a Mass Spectrometry (MS) instrument system, according to an illustrative embodiment of the present invention.

One or more compounds are selected as a Mass Spectrometry (MS) standard (1510). MS profile data is acquired on the MS standard(s) (step 1510A). Each ion fragment cluster is identified (step 1510B).

Following step 1510B, it is determined whether significant isotopes exist (step 1510N). If so, relative isotope abundances are calculated at exact masses (step 1510C). A pre-calibration step is performed (step 1510D). The pre-calibration step may involve performing pre-calibration instrument-dependent transformations on raw data, performing a pre-calibration mass spacing adjustment, and/or pre-aligning mass spectral isotope peaks.

It is then determined whether obtaining peak shape functions is desired (step 1510E). If so, convolution operations are performed on both the calculated relative isotope abundances and the measured isotope peak clusters using the same continuous function with a narrow peak width, and then a deconvolution operation is performed between the measured isotope peak clusters and the resulted isotope peak clusters after the convolution operations (step 1510T) to obtain at least one peak shape function (1510P), and the method proceeds to step 1510Q. Otherwise, convolution operations are performed between the calculated relative isotope abundances and the target peak shape functions (step 1510F) and a deconvolution operation is performed between the measured isotope peak clusters and the resulted isotope peak cluster after the convolution operations (step 1510G) to obtain at least one calibration filter (1510H).

Also following step 1510B, it is determined whether significant isotopes exist (step 1510N). If not, a pre-calibration step is performed (1510O). The pre-calibration step may involve performing pre-calibration instrument-dependent transformations on raw data, performing a pre-calibration mass spacing adjustment, and/or pre-aligning mass spectral isotope peaks.

The peak shape functions thus obtained (1510P) are interpolated (step 1510Q) before deconvolution operation (1510S) with specified target peak shape functions (step 1510R).

At step 1510S, a deconvolution operation is performed between mass spectral target peak shape functions and one of measured mass spectral peak shape functions and the calculated mass spectral peak shape functions to convert the mass spectral peak shape functions and the at least one other mass spectral peak shape function to the mass spectral target peak shape functions centered at mid-points within respective mass ranges covered by the mass spectral peak shape functions and the at least one other mass spectral peak shape function. At least one calibration filter is calculated from the mass spectral target peak shape functions centered at the mid-points within the respective mass ranges covered by the mass spectral peak shape functions and the at least one other mass spectral peak shape function (step 1510H).

An interpolation operation is performed between two calibration filters to obtain at least one other calibration filter within a desired mass range (step 1510I).

A full calibration filter set is obtained from the calibration filters of step 1510H and any resulting from the interpolation of step 1511I (step 1510J). A post-calibration step is performed (step 1510K). The post-calibration step may involve performing post-calibration instrument-dependent transformations and/or performing a post-calibration mass spacing adjustment.

Data are combined corresponding to the pre-calibration step 1510O, the full calibration filter of step 1510J, and the post-calibration step 1510K (step 1510L) to obtain a total calibration filter set $F_1$ and a variance filter set $F_2$ (step 1510M).

Figure 16:
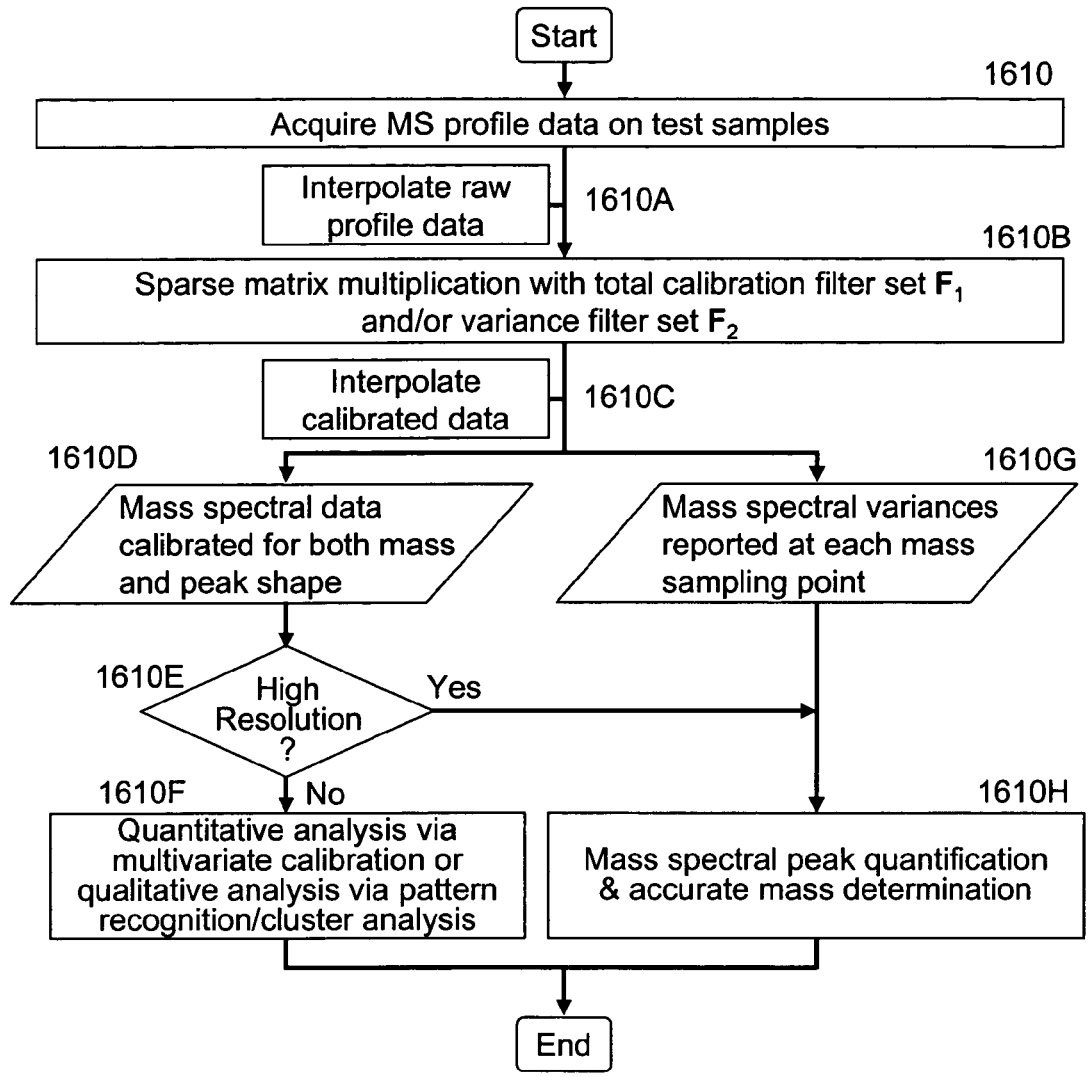
FIG. 16 is a diagram illustrating a method for processing a Mass Spectrometry (MS) spectrum obtained from an MS instrument system, according to an illustrative embodiment of the present invention.

FIG. 16 is a block diagram illustrating a method for processing Mass Spectrometry (MS) data, according to an illustrative embodiment of the present invention.

MS profile data is acquired on test samples (step 1610). The profile data is interpolated if necessary (step 1610A). Sparse matrix multiplication is performed with the total calibration filter set $F_1$ and/or the variance filter set $F_2$ (step 1610B). Calibrated data is then interpolated into reported mass spacing if necessary (step 1610C).

The mass spectral variances are reported at each mass sampling point (step 1610G), and the method proceeds to step 1610H. Also following step 1610C, the mass spectral data is calibrated for both mass and peak shape (step 1610D), and the method proceeds to step 1610E.

At step 1610E, it is determined whether the MS instrument system used is of a high enough resolution to allow for mass spectral peak identification. If so, then the method proceeds to step 1610H for mass spectral peak identification. Otherwise, the method proceeds to step 1610F for direct comparison of full mass spectral data without explicit peak identification.

At step 1610H, a mass spectral peak quantification and accurate mass determination step is performed. At step 1610F, a quantitative analysis is performed via multivariate calibration or a qualitative analysis is performed via pattern recognition/cluster analysis using the full mass spectral response curve as inputs without explicit mass spectral peak identification.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for calculating digital calibration filters for a Mass Spectrometry (MS) instrument system, comprising the step of:
   obtaining, from a given calibration ion with its isotopes, at least one actual mass spectral peak shape function,
   specifying mass spectral target peak shape functions within respective mass spectral ranges, and
   performing a deconvolution operation between the obtained at least one mass spectral peak shape function and the mass spectral target peak shape functions to obtain at least one digital calibration filter from a result of the deconvolution operation.

2. The method of claim 1, wherein the at least one mass spectral shape function can be obtained from a section of a mass spectrum that contains a single isotope peak with no significant overlaps from other isotope peaks.

3. The method of claim 1, wherein said obtaining step comprises the steps of:
   calculating, for the given calibration ion, relative isotope abundances and theoretical mass locations of the isotopes corresponding thereto;
   performing convolution operations on both the calculated relative isotope abundances and measured isotope peak clusters using a same continuous function with a narrow peak width; and
   performing a deconvolution operation between the measured isotope peak clusters and calculated isotope peak clusters after said convolution operations to obtain the at least one mass spectral peak shape function in the presence of mutually interfering isotopes.

4. The method of claim 3, wherein any of said steps of performing a convolution and deconvolution operation employs at least one of a Fourier Transform, a matrix multiplication, and a matrix inversion.

5. The method of claim 1, wherein the at least one calibration filter comprises at least two calibration filters, and said method further comprises the step of further interpolating between the at least two calibration filters to obtain at least one other calibration filter within a desired mass range.

6. The method of claim 5, wherein said interpolating step comprises the steps of:
   collecting the at least two calibration filters as vectors in a matrix for decomposition;
   decomposing the matrix that includes the at least two calibration filters;
   interpolating between decomposed vectors of the matrix to obtain interpolated vectors; and
   reconstructing the at least one other calibration filter using the interpolated vectors.

7. The method of claim 6, wherein said decomposing step is performed using at least one of Singular Value Decomposition (SVD) and wavelet decomposition.

8. The method of claim 1, wherein any of said steps of performing a deconvolution operation employs at least one of a Fourier Transform and a matrix inversion.

9. The method of claim 1, wherein said obtaining step further comprises the step of interpolating data corresponding to the mass spectral peak shape functions to obtain at least one other mass spectral peak shape function within a desired mass range.

10. The method of claim 9, wherein said interpolating step comprises the steps of:
    collecting the mass spectral peak shape functions as vectors in a matrix for decomposition;
    decomposing the matrix that includes the mass spectral peak shape functions;
    interpolating between decomposed vectors of the matrix to obtain interpolated vectors; and
    reconstructing the at least one other mass spectral peak shape function using the interpolated vectors.

11. The method of claim 10, wherein said decomposing step is performed using at least one of Singular Value Decomposition (SVD) and wavelet decomposition.

12. The method of claim 9, wherein said performing step comprises the step of performing a deconvolution operation between mass spectral target peak shape functions and one of measured mass spectral peak shape functions and the calculated mass spectral peak shape functions to convert the measured mass spectral peak shape functions and the at least one other mass spectral peak shape function to the mass spectral target peak shape functions within the respective mass spectral ranges; and
    wherein said calculating step comprises the step of calculating at least one calibration filter from the deconvolution operation.

13. The method of claim 12, wherein the at least one calibration filter comprises at least two calibration filters, and said method further comprises the step of further interpolating between the at least two calibration filters to obtain at least one other calibration filter within a desired mass range.

14. The method of claim 13, wherein said further interpolating step comprises the steps of:
    collecting the at least two calibration filters as vectors in a matrix for decomposition;
    decomposing the matrix that includes at least two calibration filters;
    interpolating between decomposed vectors of the matrix to obtain interpolated vectors; and
    reconstructing the at least one other calibration filter using the interpolated vectors.

15. The method of claim 14, wherein said decomposing step is performed using at least one of Singular Value Decomposition (SVD) and wavelet decomposition.

16. The method of claim 12, wherein said step of performing a deconvolution operation between the mass spectral target peak shape functions and one of the measured mass spectral peak shape functions and the calculated mass spectral peak shape functions employs at least one of a Fourier Transform and a matrix inversion.

17. The method of claim 1, further comprising the step of pre-aligning mass spectral isotope peaks based on a least squares fit between centroid masses of the calculated relative isotope abundances and those of the measured isotope peak clusters, in a pre-calibration step performed subsequent to said calculating step.

18. The method of claim 1, further comprising the steps of: performing pre-calibration instrument-dependant transformations on raw mass spectral data; and performing post-calibration instrument-dependent transformations on a calculated data set corresponding to a test sample.

19. The method of claim 18, wherein said steps of performing pre-calibration instrument-dependent transformations and performing post-calibration instrument-dependent transformations involve respectively creating a pre-calibration banded diagonal matrix and a post-calibration banded diagonal matrix, each nonzero column along a banded diagonal of each of the respective matrices for respectively performing an interpolation function corresponding to the pre-calibration instrument-dependent transformations and the post-calibration instrument-dependent transformations, and said method further comprises the step of creating from the at least one calibration filter a calibration banded diagonal matrix for performing both peak shape and mass axis calibration.

20. The method of claim 19, further comprising the step of multiplying the pre-calibration banded diagonal matrix, the calibration banded diagonal matrix and the post-calibration banded diagonal matrix into a total filtering matrix prior to calibrating a test sample.

21. The method of claim 20, wherein the peek shape and the mass axis calibration are performed by matrix multiplication between the total filtering matrix and the raw mass spectral data, and said method further comprises the step of creating another banded diagonal matrix to estimate mass spectral variances of a calibrated signal, the other banded diagonal matrix having each nonzero element along a banded diagonal equal to a square of a corresponding element in the total filtering matrix.

22. The method of claim 21, further comprising the step of applying a weighted regression operation to calibrated mass spectral data to obtain at least one of integrated peak areas, masses and other mass spectral peak data for the mass spectral peaks.

23. The method of claim 22, wherein weights of the weighted regression operation are proportional to an inverse of the mass spectral variances.

24. The method of claim 21, further comprising the step of applying multivariate statistical analysis to calibrated mass spectral data to at least one of quantity, identify, and classify test samples.

25. The method of claim 1, further comprising the steps of:
performing a pre-calibration mass spacing adjustment from a non-uniformly spaced mass acquisition interval to a uniformly spaced mass interval; and
performing a post-calibration mass spacing adjustment from the uniformly spaced mass interval to a reporting interval.

26. The method of claim 25, wherein said steps of performing the pre-calibration mass spacing adjustment and the post-calibration mass spacing adjustment involve respectively creating a pre-calibration banded diagonal matrix and a post-calibration banded diagonal matrix, each nonzero column along a banded diagonal of each of the respective matrices for respectively performing an interpolation function corresponding to the pre-calibration mass spacing adjustment and the post-calibration mass spacing adjustment, and said method further comprises the step of creating from the at least one calibration filter a calibration banded diagonal matrix for performing both peak shape and mass axis calibration.

27. The method of claim 26, further comprising the step of multiplying the pre-calibration banded diagonal matrix, the calibration banded diagonal matrix and the post-calibration banded diagonal matrix into a total filtering matrix prior to calibrating a test sample.

28. The method of claim 27, wherein the peak shape and the mass axis calibration are performed by matrix multiplication between the total filtering matrix and raw mass spectral data, and said method further comprises the step of crating another banded diagonal matrix to estimate mass spectral variances of a calibrated signal, the other banded diagonal matrix having each nonzero element along a banded diagonal equal to a square of a corresponding element in the total filtering matrix.

29. The method of claim 28, further comprising the step of applying a weighted regression operation to the calibrated mass spectral data to obtain at least one of integrated peak areas, masses and other mass spectral peak data for the mass spectral peaks.

30. The method of claim 29, wherein weights of the weighted regression operation are proportional to an inverse of the mass spectral variances.

31. The method of claim 28, further comprising the step of applying multivariate statistical analysis to the calibrated mass spectral data to at least one of quantify, identify, and classify test samples.

32. The method of claim 1, further comprising the step of adding the calibration standard into a test sample one of prior to and in real-time through at least one of continuous infusion and online mixing so as to acquire both calibration data and test data in one data acquisition.

33. A method of processing mass spectral data, comprising the steps of:
applying a total filtering matrix to raw mass spectral data to obtain calibrated mass spectral data,
wherein the total filtering matrix is formed by:
obtaining, from a given calibration ion with its isotopes, at least one actual mass spectral peak shape function,
specifying mass spectral target peak shape functions within respective mass spectral ranges, and
performing a deconvolution operation between the obtained at least one mass spectral peak shape function and the mass spectral target peak shape functions to obtain at least one digital calibration filter from a result of the deconvolution operation.

34. The method of claim 33, wherein said applying step further comprises the step of interpolating the raw mass spectral data onto a same mass axis as that required by the total filtering matrix.

35. The method of claim 33, wherein said applying step further comprises the step of interpolating the calibrated mass spectral data onto any desired mass axis different from that given by the total filtering matrix.

36. The method of claim 33, further comprising the step of applying a weighted regression operation to the calibrated mass spectral data to obtain at least one of integrated peak areas, masses and other mass spectral peak data for the mass spectral peaks.

37. The method of claim 36, wherein weights of the weighted regression operation arc proportional to an inverse of mass spectral variances.

38. The method of claim 33, further comprising the step of applying multivariate statistical analysis to the calibrated mass spectral data to at least one of quantify, identity, and classify test samples.

39. The method of claim 3 or claim 33, wherein the digital filter, when applied to a mass spectrum, performs at least one of noise filtering, signal averaging, mass calibration, and peak shape adjustment.

40. A method for obtaining at least one actual mass spectral peak shape function, comprising the steps of:
calculating, for a given calibration ion, relative isotope abundances and theoretical mass locations of isotopes corresponding to the at least one mass spectral peak;
performing convolution operations on both calculated relative isotope abundances and measured isotope peak clusters using a same continuous function with a narrow peak width; and
performing a deconvolution operation between the measured isotope peak clusters and calculated isotope peak clusters after said convolution operations to obtain the at least one actual mass spectral peak shape function in the presence of mutually interfering isotopes.

41. The method of claim 40, wherein the at least one mass spectral peak shape function is obtained from a section of a mass spectrum that contains at least one of many isotopes from a known ion in a calibration standard.

42. The method of claim 40, wherein any of said steps of performing a convolution and deconvolution operation employs at least one of a Fourier Transform, a matrix multiplication, and a matrix inversion.

43. The method of claim 40, further comprising the step of interpolating data corresponding to the mass spectral peak shape functions to obtain at least one other mass spectral peak shape function within a desired mass range.

44. The method of claim 43, wherein said interpolating step comprises the steps of:
collecting the mass spectral peak shape functions as vectors in a matrix for decomposition;
decomposing the matrix that includes the mass spectral peak shape functions;
interpolating between decomposed vectors of the matrix to obtain interpolated vectors; and
reconstructing the at least one other mass spectral peak shape function using the interpolated vectors.

45. The method of claim 44, wherein said decomposing step is performed using at least one of Singular Value Decomposition (SVD) and wavelet decomposition.

46. The method of claim 40, further comprising:
specifying mass spectral target peak shape function; and
performing a deconvolution operation between the obtained at least one mass spectral peak shape function and the mass spectral target peak shape functions.

47. The method of claim 46, wherein said performing step comprises the step of performing a deconvolution operation between mass spectral target peak shape functions and one of measured mass spectral peak shape functions and calculated mass spectral peak shape functions to convert measured mass spectral peak shape functions and the at least one other mass spectral peak shape function to the mass spectral target peak shape functions.

48. The method of claim 47, wherein said calculating step comprises the step of calculating at least one calibration filter from the deconvolution operation.

49. The method of claim 48, wherein the at least one calibration filter comprises at least two calibration filters, and said method further comprises the step of interpolating between the at least two calibration filters to obtain at least one other calibration filter within a desired mass range.

50. The method of claim 49, wherein said interpolating step comprises the steps of:
collecting the at least two calibration filters as vectors in a matrix for decomposition;
decomposing the matrix that includes at least two calibration filters;
interpolating between decomposed vectors of the matrix to obtain interpolated vectors; and
reconstructing the at least one other calibration filter using the interpolated vectors.

51. The method of claim 50, wherein said decomposing step is performed using at least one of Singular Value Decomposition (SVD) and wavelet decomposition.

52. The method of claim 48, further comprising the steps of: performing pre-calibration instrument-dependant transformations on raw mass spectral data; and performing post-calibration instrument-dependent transformations on a calculated data set corresponding to a test sample.

53. The method of claim 52, wherein said steps of performing pre-calibration instrument-dependent transformations and performing post-calibration instrument-dependent transformations involve respectively creating a pre-calibration banded diagonal matrix and a post-calibration banded diagonal matrix, each nonzero element along a banded diagonal of each of the respective matrices for respectively performing an interpolation function corresponding to the pre-calibration instrument-dependent transformations and the post-calibration instrument-dependent transformations, and said method further comprises the step of creating front the at least one calibration filter a calibration banded diagonal matrix for performing both peak shape and mass axis calibration.

54. The method of claim 53, further comprising the step of multiplying the pre-calibration banded diagonal matrix, the calibration banded diagonal matrix and the post-calibration banded diagonal matrix into a total filtering matrix prior to calibrating a test sample.

55. The method of claim 54, wherein the peak shape and the mass axis calibration are performed by matrix multiplication between the total filtering matrix and the raw mass spectral data, and said method further comprises the step of creating another banded diagonal matrix to estimate mass spectral variances of a calibrated signal, the other banded diagonal matrix having each nonzero element along a banded diagonal equal to a square of a corresponding element in the total filtering matrix.

56. The method of claim 55, further comprising the step of applying a weighted regression operation to calibrated mass spectral data to obtain at least one of integrated peak areas, actual masses and other mass spectral peak data for the mass spectral peaks.

57. The method of claim 56, wherein weights of the weighted regression operation are proportional to an inverse of the mass spectral variance.

58. The method of claim 55, further comprising the step of applying multivariate statistical analysis to calibrated mass spectral data to at least one of quantify, identify, and classify test samples.

59. The method of claim 51, wherein said step of performing a deconvolution operation between the mass spectral target peak shape functions and one of the measured mass spectral peak shape functions and the calculated mass spectral peak shape functions employs at least one of a Fourier Transform and a matrix inversion.

60. The method claim 40, further comprising the step of pre-aligning mass spectral isotope peaks based on a least squares fit between centroid masses of the calculated relative isotope abundances and those of measured isotope peak clusters, in a pre-calibration step performed subsequent to said calculating step.

61. The method of claim 40, further comprising the steps of:
performing a pre-calibration mass spacing adjustment from a non-uniformly spaced mass acquisition interval to a uniformly spaced mass interval; and
performing a post-calibration mass spacing adjustment from the uniformly spaced mass interval to a reporting interval.

62. The method of claim 61, wherein said steps of performing the pre-calibration mass spacing adjustment and the post-calibration mass spacing adjustment involve respectively creating a pre-calibration banded diagonal matrix and a post-calibration banded diagonal matrix, each nonzero element along a banded diagonal of each of the respective matrices for respectively performing an interpolation function corresponding to the pre-calibration mass spacing adjustment and the post-calibration mass spacing adjustment, and said method further comprises the step of creating from the at least one calibration filter a calibration banded diagonal matrix for performing both peak shape and mass axis calibration.

63. The method of claim 62, further comprising the step of multiplying the pre-calibration banded diagonal matrix, the calibration banded diagonal matrix and the post-calibration banded diagonal matrix into a total filtering matrix prior to calibrating a test sample.

64. The method of claim 63, wherein the peak shape and the mass axis calibration are performed by matrix multiplication between the total filtering matrix and raw mass spectral data, and said method further comprises the step of creating another banded diagonal matrix to estimate mass spectral variances of a calibrated signal, the other banded diagonal matrix having each nonzero element along a banded diagonal equal to a square of a corresponding element in the total filtering matrix.

65. The method of claim 64, further comprising the step of applying a weighted regression operation to the calibrated mass spectral data to obtain at least one of integrated peak areas, masses and other mass spectral peak data for the mass spectral peaks.

66. The method of claim 65, wherein weights of the weighted regression operation are proportional to an inverse of the mass spectral variances.

67. The method of claim 64, further comprising the step of applying multivariate statistical analysis to the calibrated mass spectral data to at least one of quantify, identify, and classify test samples.

68. The method of claim 40, further comprising the step of adding the calibration standard into a test sample one of prior to and in real-time through at least one of continuous infusion and online mixing so as to acquire both calibration data and test data in a single mass spectral acquisition.

69. For use with a mass spectrometer having associated therewith a computer for performing data analysis functions of data produced by the mass spectrometer, a computer readable medium readable by said computer, said computer readable medium having thereon computer readable program instructions for performing the method of any one of claims 1 to 68.

70. A mass spectrometer having associated therewith a computer for performing data analysis functions of data produced by the mass spectrometer, the computer performing the method of any one of claims 1 to 68.

* * * * *